(12) United States Patent
Kusakabe et al.

(10) Patent No.: US 12,159,611 B2
(45) Date of Patent: Dec. 3, 2024

(54) VIDEO CONTROL DEVICE AND VIDEO CONTROL METHOD

(71) Applicant: Roland Corporation, Shizuoka (JP)

(72) Inventors: Satoshi Kusakabe, Shizuoka (JP); Yasuto Saito, Shizuoka (JP)

(73) Assignee: Roland Corporation, Shizuoka (JP)

( * ) Notice: Subject to any disclaimer, the term of this patent is extended or adjusted under 35 U.S.C. 154(b) by 786 days.

(21) Appl. No.: 17/295,853

(22) PCT Filed: Nov. 22, 2018

(86) PCT No.: PCT/JP2018/043295
§ 371 (c)(1),
(2) Date: May 20, 2021

(87) PCT Pub. No.: WO2020/105195
PCT Pub. Date: May 28, 2020

(65) Prior Publication Data

US 2022/0020348 A1     Jan. 20, 2022

(51) Int. Cl.
*G10H 1/40* (2006.01)
*G10H 1/00* (2006.01)
*G10H 1/36* (2006.01)

(52) U.S. Cl.
CPC .............. *G10H 1/40* (2013.01); *G10H 1/0008* (2013.01); *G10H 1/368* (2013.01); *G10H 2210/076* (2013.01); *G10H 2240/325* (2013.01)

(58) Field of Classification Search
CPC ........ G10H 1/40; G10H 1/0008; G10H 1/368; G10H 2210/076; G10H 2240/325
See application file for complete search history.

(56) References Cited

U.S. PATENT DOCUMENTS

| | | | |
|---|---|---|---|
| 7,301,092 B1 | 11/2007 | McNally et al. |
| 7,534,951 B2 | 5/2009 | Yamashita |
| 7,923,621 B2 | 4/2011 | Shiraishi et al. |
| 8,269,093 B2 | 9/2012 | Naik et al. |
| 8,436,241 B2 | 5/2013 | Yamashita et al. |
| 8,704,069 B2 | 4/2014 | Naik et al. |
| 10,262,640 B2 | 4/2019 | Takehisa et al. |
| 2005/0117032 A1 | 6/2005 | Ueda et al. |
| 2006/0127054 A1 | 6/2006 | Matsuyama |
| 2010/0282045 A1 | 11/2010 | Chen et al. |
| 2011/0144780 A1 | 6/2011 | Ueshima et al. |

(Continued)

FOREIGN PATENT DOCUMENTS

| | | |
|---|---|---|
| JP | 2002150689 | 5/2002 |
| JP | 2003289494 | 10/2003 |

(Continued)

OTHER PUBLICATIONS

"Office Action of China Counterpart Application", issued on Oct. 16, 2023, with English translation thereof, p. 1-p. 33.

(Continued)

*Primary Examiner* — Jianchun Qin

(74) *Attorney, Agent, or Firm* — JCIPRNET

(57) ABSTRACT

This video control device includes: a detection unit that detects a beat timing of audio; and a control unit that updates a display mode of a video on the basis of the beat timing and change information indicating a change in a display mode of a video displayed on a display device.

20 Claims, 17 Drawing Sheets

(56) References Cited

U.S. PATENT DOCUMENTS

2019/0026366 A1* 1/2019 Park .................. H04N 21/262
2019/0244639 A1* 8/2019 Benedetto ............... G11B 27/11

FOREIGN PATENT DOCUMENTS

| | | |
|---|---|---|
| JP | 2004302053 | 10/2004 |
| JP | 2006102080 | 4/2006 |
| JP | 2007033851 | 2/2007 |
| JP | 2008275975 | 11/2008 |
| JP | 2008283305 | 11/2008 |
| JP | 2009092681 | 4/2009 |
| JP | 2009098262 | 5/2009 |
| JP | 2010055076 | 3/2010 |
| JP | 4561735 | 10/2010 |
| JP | 4622479 | 2/2011 |
| JP | 2017219595 | 12/2017 |
| JP | 2018180480 | 11/2018 |
| WO | 2008129837 | 10/2008 |

OTHER PUBLICATIONS

"International Search Report (Form PCT/ISA/210) of PCT/JP2018/043295," mailed on Feb. 26, 2019, with English translation thereof, pp. 1-4.

* cited by examiner

VIDEO CONTROL DEVICE AND VIDEO CONTROL METHOD

CROSS-REFERENCE TO RELATED APPLICATION

This application is a 371 application of the International PCT application serial no. PCT/JP2018/043295, filed on Nov. 22, 2018. The entirety of the above-mentioned patent application is hereby incorporated by reference herein and made a part of this specification.

TECHNICAL FIELD

The present invention relates to a video control device and a video control method.

BACKGROUND ART

In the related art, there is a content playback device that corrects a beat position detected from a pulsation of external musical performance sound based on input correction information, reads a lyric track in synchronization with the external musical performance sound, and generates a lyric subtitle (for example, Patent Literature 1). There is an image browsing device that sets a threshold from a peak value of a high and/or low range of an audio and switches display of a video in accordance with a time interval at which an audio level exceeds the threshold (for example, Patent Literature 2). There are methods of synchronizing and mixing beats of a plurality of media including audios and videos (for example, Patent Literatures 3 and 4). There is a timing control device that displays an animation of a drum being hit (for example, Patent Literature 5).

CITATION LIST

Patent Literature

Patent Literature 1

Japanese Patent No. 4561735

Patent Literature 2

Japanese Patent No. 4622479

Patent Literature 3

U.S. Pat. No. 8,269,093

Patent Literature 4

U.S. Pat. No. 8,704,069

Patent Literature 5

PCT International Publication No. WO 2008/129837

SUMMARY

Technical Problem

In the technologies of the related art, when a video is controlled in accordance with an audio, it is necessary for a user to manually control the video, hearing the audio. An objective of the present invention is to provide a technology capable of changing display content of a display device in accordance with an audio.

Solution to Problem

According to an aspect of the present invention, a video control device includes a detection unit configured to detect a beat timing of an audio; and a control unit configured to change a display mode of a video displayed on a display device based on the beat timing and change information indicating change content of the display mode.

In the video control device according to the aspect of the present invention, the control unit may perform, as the change in the display mode, one of:
(i) switching from a video to another video;
(ii) addition of an effect to a video;
(iii) a change in the effect added to the video; and
(iv) cancellation of an effect added to a video.

In the video control device according to the aspect of the present invention, when the switching from the video to another video is performed as the change in the display mode of the video, the video may include a first video to which the audio is added and a second video different from the first video. The control unit may perform a parallel playback process of the first and second videos and perform repeated playback of one of the first and second videos which ends during playback of the other one of the first and second videos.

In the video control device according to the aspect of the present invention, when the switching from the video to another video is performed as the change in the display mode of the video, the video may include a first video and a second video different from the first video. The control unit may perform a parallel playback process of the audio, the first video, and the second video and performs repeated playback of the first video or the second video ended during playback of the audio.

In the video control device according to the aspect of the present invention, the control unit may change a parameter of the video related to the effect when the control unit perform the addition of the effect to the video as the change in the display mode.

In the video control device according to the aspect of the present invention, the control unit may change intensity of the parameter in accordance with a waveform of a temporally changing predetermined signal. The predetermined signal may be, for example, a signal of the audio or a signal in which a signal different from a signal of the audio is mixed with the signal of the audio.

In the video control device according to the aspect of the present invention, the control unit may change the display mode using a plurality of continuous detections of the beat timing as a trigger. The control unit may change the display mode a plurality of times within an interval of the beat timing. The control unit may change the display mode at an interval of the finally detected beat timing in a non-detection section in which the beat timing is not detected.

In the video control device according to the aspect of the present invention, the control unit may determine a timing at which the display mode is changed in a non-detection section in which the beat timing is not detected, based on an interval of the beat timing before and after the non-detection section. The control unit may change the display mode whenever a musical piece which is an audio goes back from a first beat timing by an interval between the first beat timing and a subsequent beat timing in a section from start of the musical piece to the first beat timing.

According to a second aspect of the present invention, a video control device includes: a detection unit configured to detect a beat timing of an audio; and a control unit configured to control a video displayed on a display device based on the beat timing. For example, the control unit may switch a video displayed on the display device to another video as controlling of the video. Alternatively, for example, the control unit may perform at least one of addition of an effect, a change in the effect, and cancellation of the addition on the video displayed on the display device as the controlling of the video.

According to a third aspect of the present invention, a video control method includes: detecting a beat timing of an audio; and controlling a video displayed on a display device based on the beat timing.

As the control of the video, for example, a video displayed on the display device may be switched to another video. As the control of the video, for example, at least one of addition of an effect, a change in the effect, and cancellation of the addition on the video displayed on the display device may be performed.

According to a fourth aspect of the present invention, a video control device includes: a detection unit configured to detect a beat timing of an audio from a video having the audio which is being reproduced; and a control unit configured to control the video having the audio displayed on a display device based on the beat timing.

In the first to fourth aspects of the present invention, the beat timing may be detected in advance or may be detected in real time.

In the first, second, and fourth aspects, the detection unit may perform a process of generating timing information for governing a beat of an input audio and intensity data indicating power at a timing from data of the input audio, a process of calculating a period and a phase of the beat of the audio using the intensity data, and a process of detecting the beat timing based on the period and the phase of the beat of the audio.

In the first, second, and fourth aspects, the detection unit may perform Fourier transform that has an attenuation term on the intensity data with regard to a plurality of beats per minute (BPMs) and calculate, as the period of the beat of the audio, the BPM when an absolute value of a value of the Fourier transform is maximum.

In the first, second, and fourth aspects, the detection unit may obtain a plurality of wavelet-transformed values by performing the Fourier transform on a plurality of values obtained by multiplying window functions shifted by a 1/n period of the BPM corresponding to the period of the beat of the audio by the intensity data, and calculate, as the phase of the beat of the audio, a phase when absolute values of the plurality of wavelet-transformed values are maximum.

In the first, second, and fourth aspects, the detection unit may obtain a count value indicating the period of the beat and the phase of the beat, measure the count value using a counter incremented for each sample of a sampling rate, and detect a timing at which a value of the counter reaches the count value as the beat timing.

DESCRIPTION OF THE EMBODIMENTS

Figure 1:
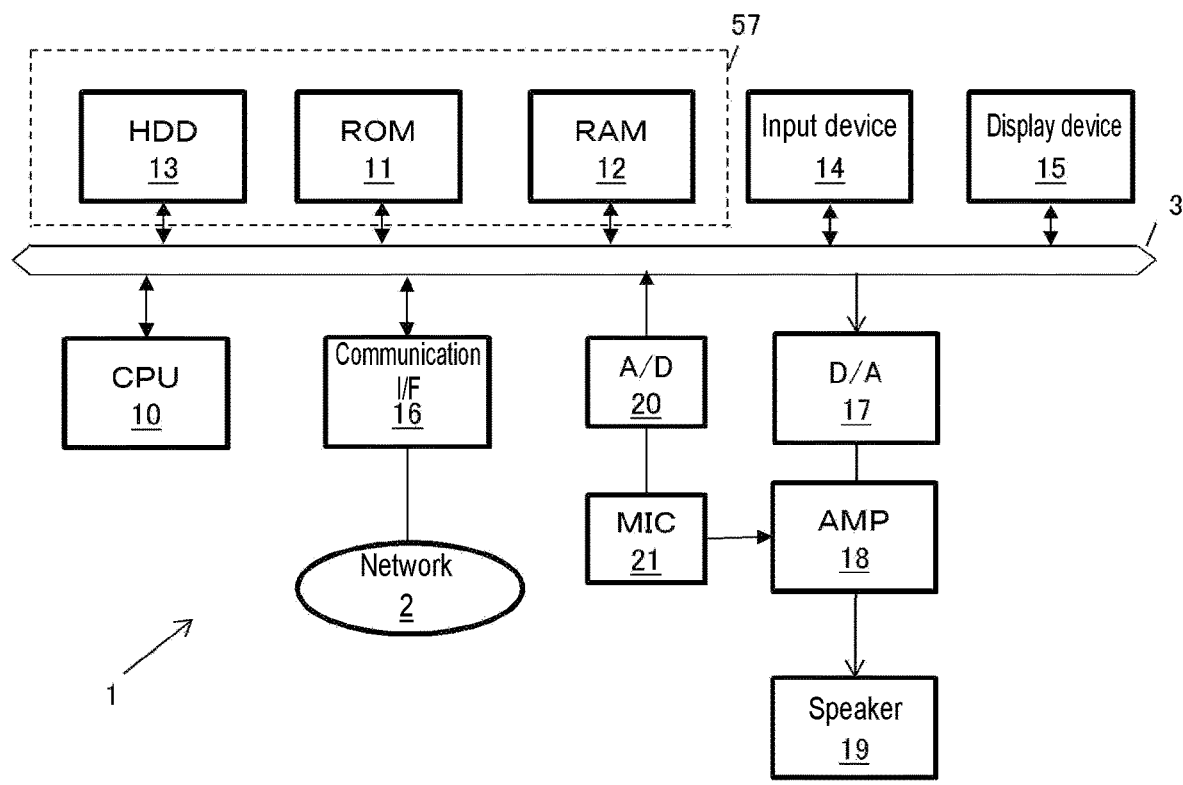
FIG. 1 is a diagram illustrating a configuration example of an information processing device (a computer) which can be operate as a video control device.

The following video control device will be described as a video control device according to an embodiment.

[1] A video control device including:

a detection unit configured to detect a beat timing of an audio; and a control unit configured to change a display mode of a video displayed on a display device based on the beat timing and change information indicating change content of the display mode.

[2] A video control device including:
  a detection unit configured to detect a beat timing of an audio; and
  a control unit configured to control a video displayed on a display device based on the beat timing.

[3] A video control device including:
  a detection unit configured to detect a beat timing of an audio from a video having the audio which is being reproduced; and
  a control unit configured to control the video having the audio displayed on a display device based on the beat timing.

Here, audios (also referred to as acoustic sounds) include sounds of musical instruments, voices of people, musical pieces, and other various sounds. The audios may be also audios generated in a real time in reproduced audios. A video (a moving image: a movie or a video) is formed by a plurality of still images (frame images) switched and displayed in accordance with a predetermined frame rate. A video includes a video in a case in which a difference in a motion vector or a pixel value does not occur during a predetermined period or between frame images, that is, a case in which still images are displayed. Accordingly, a video includes not only a video indicating a motion of an object or a background in a screen but also a video (a slide show) in which a plurality of still images is continuously displayed over time. A video may be a reproduced video in which information recorded on a medium is used or may be a video which is reproduced in real time using information obtained from a data stream. The beat timing may be a beat timing detected in advance or may be a beat timing which is detected in real time in audio.

Each of a "change in a display mode" and "control of a video" can include at least one of the following (i) and (iv):
  (i) switching from a video displayed on a display device to another video;
  (ii) addition of an effect to a video displayed on the display device;
  (iii) a change in an effect added to a video displayed on the display device; and
  (iv) cancellation of an effect added to a video displayed on the display device.

When a video displayed on a display device is switched to another video, an original video and a switching destination video may be alternately switched or two or more switching destination videos may be prepared. The "effect" is a visual effect (a video effect) appearing on a display screen. For example, the effects include a change in luminance (flashing) of a video, a change in a color (a pixel value), reversion of a pixel value, addition of a 2-dimensional or 3-dimensional video (a figure or the like), a change in the degree of enhancement of an edge (a contour line) in a video, and deformation (distortion) of a video. Parameters of a video related to the effect are managed. The parameters related to the effect include luminance, a pixel value, and the degree of enhancement of an edge of a video. The parameters may include others. When values of the parameters related to the effects are changed, addition of an effect and cancellation of the addition are performed. Alternatively, when the kinds of parameters are changed, the effects are changed.

A length of a time in which a change in the display mode is (control of a video) is performed (a time in which a video is switched to another video or a time in which one effect or two or more effects are added to a video) can be appropriately determined. A start timing of the change in the display mode (the control of the video) can be set to, for example, a time point of a beat timing or a predetermined time point before or after the beat timing. The start timing of the change is equal to, n times (where n is an integer equal to or greater than 2), 1/n times an interval of the beat timing. An end timing of the change in the display mode (the control of the video) can be set to a time point which has passed by a fixed time from start of the change, a time point at which a subsequent beat timing is detected, or a time point equal to, n times, 1/n times the interval of the beat timing.

In the video control device, when the switching from the video to another video (the control of the video) is performed as the change in the display mode of the video, the video may include a first video to which the audio is added and a second video different from the first video. The control unit may perform a parallel playback process of the first and second videos and perform repeated playback of one of the first and second videos which ends during playback of the other one of the first and second videos.

In the video control device, when the switching from the video to another video (the control of the video) is performed as the change in the display mode of the video, the video may include a first video to which the audio is added and a second video different from the first video. The control unit may perform a parallel playback process of the audio, the first video, and the second video and perform repeated playback of the first video or the second video ended during playback of the audio.

In the video control device, a configuration in which the control unit performs at least one of the addition of the effect to the video displayed on the display device which is addition of the effect to the video, the change in the effect, and the cancellation of the addition as the change in the display mode (the control of the video) may be adopted. The effect is a visual effect (a video effect) appearing in a video. For example, the effects include a change in luminance of a video (including flashing), a change (reversion or the like) in a color (a pixel value), addition or superimposition of a 2-dimensional or 3-dimensional image or a video (text, a figure, a sign, a pattern, a signal waveform of an audio, or the like), a change in the degree of enhancement of an edge (a contour line) in a video, deformation of a video, and addition of distortion.

In the video control device, a configuration in which the control unit changes a parameter of a video related to the effect when the addition of the effect to the video is performed as the change of the display mode (the control of the video) may be adopted. A configuration in which the control unit changes intensity of the parameter in accordance with a waveform of a temporally changing predetermined signal may be adopted. The predetermined signal includes, for example, a signal of an audio, a signal of one other than an audio, a signal in which a signal other than a signal of an audio is mixed with the signal of the audio signal, and a signal in which two or more signals other than an audio signal can be mixed. A configuration in which a plurality of kinds of waveforms (patterns) is prepared as waveforms of signals used to change the intensity of the parameter and a pattern is selected by a user may be adopted.

In the video control device, a configuration in which the control unit changes the display mode (performs the control of the video) using a plurality of continuous detections of the beat timing as a trigger may be adopted. A configuration in which the control unit changes the display mode (performs the control of the video) a plurality of times within an interval of the beat timing may be adopted. In this case, an interval of the video control within the interval may be or may not be an equal interval.

In the video control device, a configuration in which the control unit changes the display mode (performs the control of the video) at an interval of the finally detected beat timing in a non-detection section in which the beat timing is not detected may be adopted. A configuration in which the control unit determines a timing at which the display mode is changed in the non-detection section in which the beat timing is not detected (performs the control of the video) based on an interval of the beat timing before and after the non-detection section may be adopted. When an average value of intervals before and after the beat timing is adopted as the timing at which the change in the display mode (the control of the video) is performed, a value from interpolation between the two may be adopted.

In the video control device, a configuration in which the control unit performs control of the video whenever a musical piece which is an audio goes back from a first beat timing by an interval between the first beat timing and a subsequent beat timing in a section from start of the musical piece to the first beat timing may be adopted.

Hereinafter, a video control device, a video control method, a device generating a beat sound generation timing, and a method of generating a beat sound generation timing according to embodiments will be described with reference to the drawings. Configurations of the embodiments are exemplary. The present invention is not limited to the configurations of the embodiments.

First Embodiment

Configuration of Information Processing Device

FIG. 1 is a diagram illustrating a configuration example of an information processing device (a computer) which can be operated as a video control device. The information processing device may be a smart medium such as a smartphone or a tablet terminal, a general-purpose computer such as a personal computer, or a dedicated computer. The information processing device 1 may not be a portable device. In the following description, the information processing device 1 which is a smartphone will be described.

In FIG. 1, the information processing device 1 includes a central processing unit (CPU) 10, a read-only memory (ROM) 11, a random access memory (RAM) 12, a hard disk drive (HDD) 13, an input device 14, a display device 15, and a communication interface (communication I/F) 16 connected to a bus 3. The information processing device 1 further includes a digital/analog converter (D/A) 17 and an analog/digital converter (A/D) 20 connected to the bus 3. An amplifier (AMP) 18 is connected to the D/A 17 and a speaker 19 is connected to the AMP 18. A microphone (MIC) 21 is connected to the A/D 20.

The ROM 11 stores various programs executed by the CPU 10 or data used in execution of the programs. The RAM 12 is used as a loading region of a program, a working region of the CPU 10, a storage region for data, and the like. The RAM 12 is used as a video RAM on which frame images of a video displayed on the display device 15 are drawn.

The HDD 13 stores a program, data used in execution of the program, musical piece data, and the like. The musical piece data is, for example, audio (acoustic) data that has a format of a predetermined audio file, such as a MP3 or WAVE format. The format form of the audio file may be a format form other than the MP3 or Wave form.

The HDD 13 stores a plurality of kinds of video files. The format form of the video file does not matter. For the video file, there are a case in which both video data and audio data are included and a case in which audio data is not included. The audio file and the video file have a time table (information regarding a playback time), and a video and an audio are reproduced in accordance with a time table. In an audio of an audio file and an audio of a video file, information indicating a timing at which a beat is generated (referred to as a beat timing) (referred to as beat timing information) is stored in association with a playback time. Here, it is not essential that the information indicating a beat timing be included in a video file or an audio file.

The ROM 11 and the RAM 12 are examples of a main storage device and the HDD 13 is an example of an auxiliary storage device. The main storage device and the auxiliary storage device are examples of storage devices, storage media, or memories. Hereinafter, the ROM 11, the RAM 12, and the HDD 13 are collectively written as a "storage device 57" in some cases.

The input device 14 is a key, a button, a touch panel, or the like and is used to input information (including an instruction or a command). The display device 15 is used to display information. The communication I/F 16 is connected to a network 2 and is in charge of a process related to communication. For example, the CPU 10 can download desired musical piece data (musical piece signal) from the network 2 in response to an instruction input from the input device 14 and stores the desired musical piece data in the HDD 13.

The CPU 10 performs various processes by executing programs. As the processes, not only processes related to the foregoing musical piece download but also processes related to playback of an audio or a video are performed. The CPU 10 performs a process of detecting a beat timing using beat timing information in an audio file or a video file and a process of controlling a video based on the detected beat timing. The control of a video includes switching of a video displayed on the display device 15, addition of an effect to the video, a change in the effect, and cancellation of the addition.

For example, when the CPU 10 reproduces musical piece data, the CPU 10 generates digital data (a digital signal) indicating a sound of a musical piece from the musical piece data read from the HDD 13 to the RAM 12 by executing a program and supplies the digital data to the D/A 17. The D/A 17 performs digital/analog conversion to convert the digital data indicating an audio into an analog signal and outputs the analog signal to the AMP 18. The analog signal of which an amplitude is adjusted by the AMP 18 is output from the speaker 19.

The MIC 21 collects a sound such as a singing sound in which a musical piece sound output from the speaker 19 is accompanied (karaoke). An amplitude of the analog audio signal collected by the MIC 21 is amplified by the AMP 18 and the audio signal is amplified from the speaker 19. At this time, the signing sound may be mixed with the musical piece sound or may be output from separate speakers.

The MIC 21 is also used when an audio accompanied using a musical instrument (so-called live music) or a reproduced audio of a musical piece from an external device is collected and a volume of the audio is amplified (output from the speaker 19) or the audio is recorded. For example, a signal of a performed musical sound collected by the MIC 21 is converted into a digital signal by the A/D 20 to be delivered to the CPU 10. The CPU 10 converts the signal of the performed musical sound into a form with a format of an audio file to generate an audio file and stores the audio file in the HDD 13.

The information processing device 1 may include a drive device (not illustrated) of a disc type recording medium such as a compact disc (CD), a DVD, or a Blu-ray disc. In this case, a digital signal indicating a sound of a musical piece read from a disc type recording medium using the drive device may be supplied to the D/A 17 and a musical piece sound or a video may be reproduced. In this case, in a sound signal of the musical piece read from the disc type recording medium, a beat timing may be detected.

Configuration of Video Control Device

Figure 2:
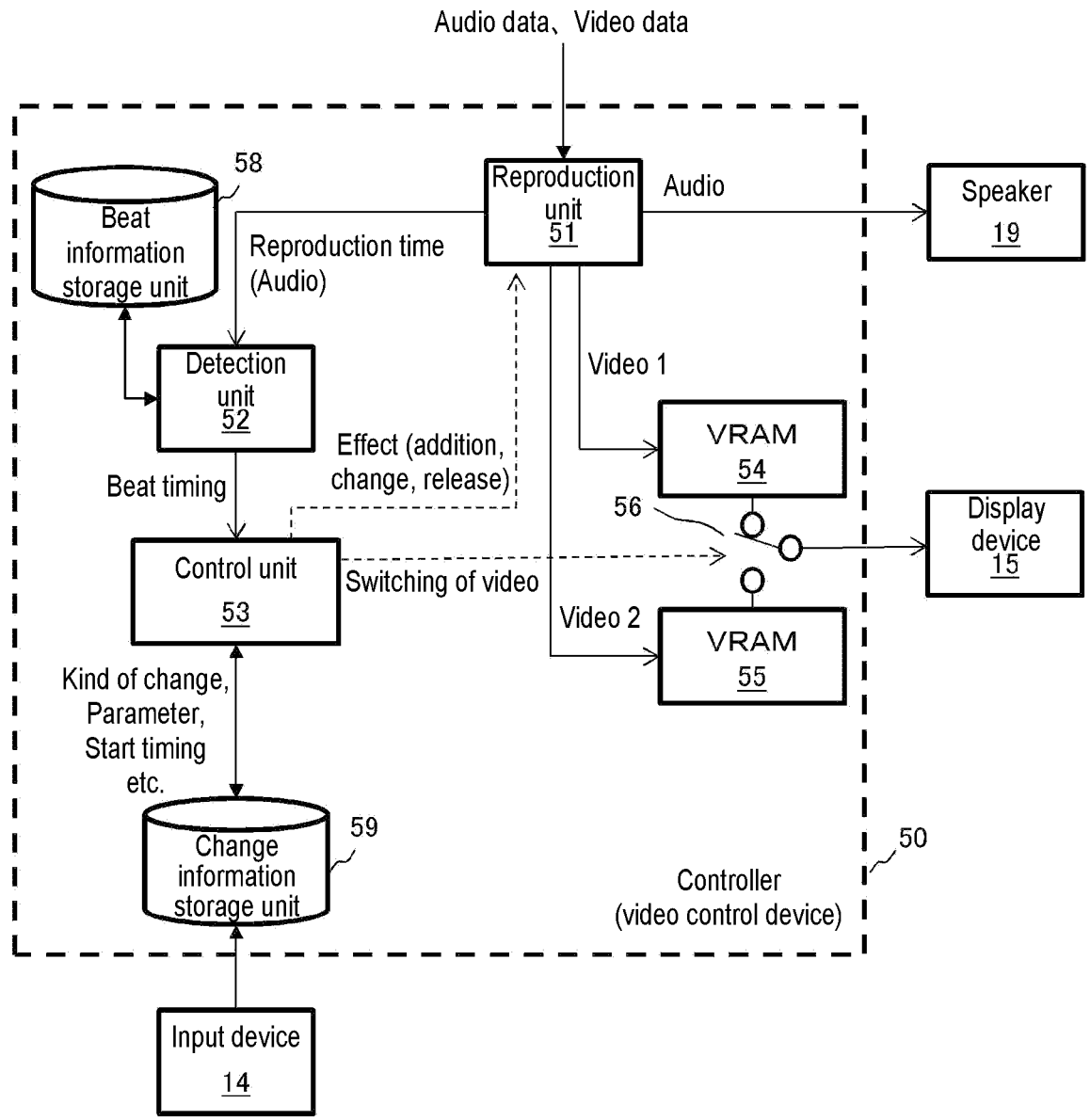
FIG. 2 is a diagram schematically illustrating a video control device (a controller).

FIG. 2 is a diagram schematically illustrating a video control device (a controller). In FIG. 2, the CPU 10 operates as the controller 50 by executing a program stored in the storage device 57. In the controller 50, the CPU 10 operates as a playback unit 51, a detection unit 52, and a control unit 53. In the storage device 57, a first VRAM (VRAM 54), a second VRAM (VRAM 55), a beat information storage unit 58, and a change information storage unit 59 are provided.

Audio data, video data, and video data having an audio are input to the playback unit 51. The input audio data, video data, and video data having the audio may be data read from a medium (the storage device 57, a disc storage device, or the like) and related to playback or may be data received from the network 2 and related to stream playback.

The playback unit 51 performs a playback process for an audio and a video based on the input audio data, video data, and video data having the audio. That is, the playback unit 51 generates and outputs an audio signal based on the audio data and the audio data included in the video data having the audio. The audio signal is processed by the D/A 17 and the AMP 18 (which are omitted in FIG. 2) and arrives at the speaker 19, and the audio based on the audio signal is output from the speaker 19. In a video according to the embodiment, whether a difference in a pixel value between frame rates or frames occurs does not matter. That is, a video includes a case in which only one still image (an image) is displayed or a case (a slide show) in which a plurality of still images (images) is switched over time.

The playback unit 51 draws an image (a frame image) based on the video data and the video data having the audio on the VRAM. The frame image drawn on the VRAM is rewritten at a predetermined frame rate. A signal of the frame image written on the VRAM is output to the display device 15. The display device 15 displays a video based on the signal of the video on a screen included in the display device 15 (that is, a frame image switched in accordance with a frame rate).

In the example illustrated in FIG. 2, a plurality of VRAMs (for example, two VRAMs 54 and 55) is provided. Here, the number of VRAMs (a playback number which can be processed in parallel) may be greater than 2. The playback unit 51 performs a parallel playback process on a plurality of pieces of video data (video files) and draws the frame images on the corresponding VRAMs. In the example illustrated in FIG. 2, the playback unit 51 draws a video based on first video data (which is an example of a first video) on the VRAM 54 and draws a video based on second video data (which is an example of a second video) on the VRAM 55. One of a signal of the video output from the VRAM 54 and a signal of the video output from the VRAM 55 is output to the display device 15 via the switch 56. The switch 56 is controlled by the control unit 53.

The detection unit 52 receives an identifier and data of an audio playback time from the playback unit 51. The identifier is, for example, an identifier of the audio data or the video data having the audio, but the present invention is not limited thereto. The identifier and the data of the audio playback time are included in the audio data or the video data having the audio input to the playback unit 51.

In the beat information storage unit 58, information indicating a beat generation timing (beat timing) (referred to as beat information) is stored on a time axis of a playback time of the audio or the video having the audio in association with the identifier. The detection unit 52 outputs a signal indicating detection of the beat timing at a timing at which a time on a playback time matches a time of the beat timing of the beat information and supplies the signal to the control unit 53. The detection unit 52 is configured to detect the beat timing determined in advance, as described in the example illustrated in FIG. 2. Here, the detection unit 52 may be configured to receive the audio signal from the playback unit 51 and calculate the beat timing in real time.

The control unit 53 performs a change in a display mode of a video displayed on the display device 15 (control of the video) based on the beat timing input from the detection unit 52 and the change information stored in the change information storage unit 59.

The change information is information regarding the change in the display mode of the video display on the display device 15 and includes information indicating a kind of change in the display mode, information indicating an effect or the video used for the change, information indicating a parameter of the video used to add an effect, and information indicating a start timing of the change.

The information indicating the kind is information indicating that the change or control is one of "switching of the video," "addition of an effect to the video," a "change in the effect added to the video," and "cancellation of the effect added to the video."

The information indicating the video used for the change is information for specifying a switching destination video when the kind of change is switching of the video. One switching destination video or two or more switching destination videos may be prepared. The information indicating the video used for the change is information for specifying an effect of the addition, the change, or the cancellation target when the kind of change is addition of the effect, a change in the effect, or cancellation of the added effect.

The information indicating the parameter of the video used to add the effect is information for specifying the parameter in the video used to add the effect. For example, the parameter is luminance of the video, the degree of enhancement of an edge of the video, the degree of reversion of a color (a pixel value), the degree of posterization (a change in a gray scale), or the like. The parameter is not limited thereto. A change amount of the parameter for adding an effect may be determined in advance by a user or the like. The change may be an increase, a decrease, or an increase and decrease.

Figure 3A:
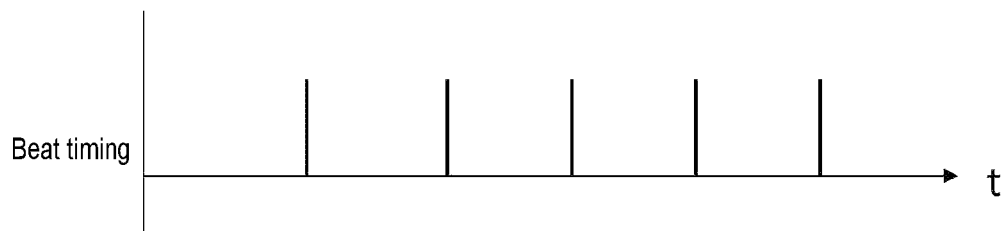
FIG. 3A is a diagram illustrating a beat timing.
Figure 3B:
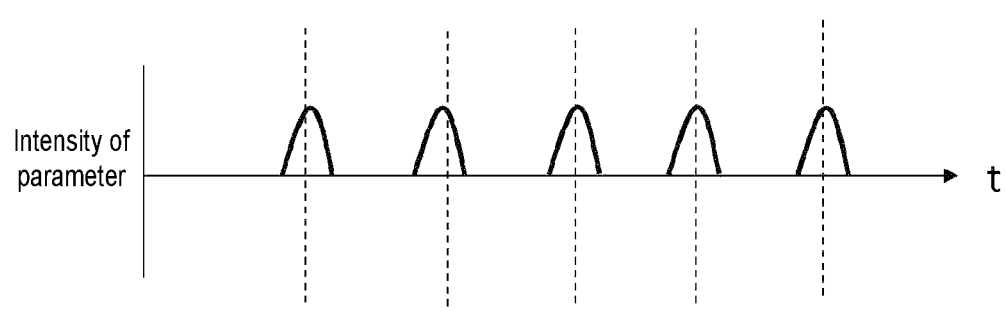
FIG. 3B is a diagram illustrating an amount of variation in a parameter in accordance with a beat timing.
Figure 3C:
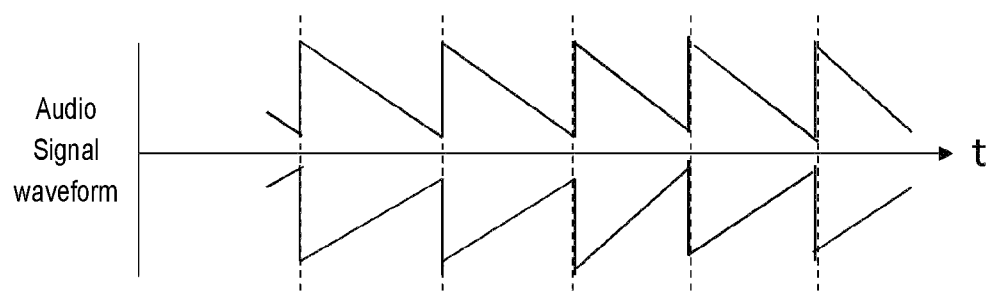
FIG. 3C is a diagram illustrating an audio waveform which is an example of a predetermined signal waveform.

The intensity of the parameter may be changed in accordance with a waveform of a predetermined signal during addition of an effect. FIG. 3A is a diagram illustrating a beat timing and FIG. 3B is a diagram illustrating an amount of variation in a parameter in accordance with a beat timing. A waveform illustrated in FIG. 3B is an example of the waveform of the predetermined signal and is an example of a signal waveform other than an audio. FIG. 3C is a diagram illustrating an audio signal waveform which is an example of a predetermined signal waveform. In the examples illustrated in FIGS. 3A and 3B, the control unit 53 increases and decreases a value of a parameter in a rise in a predetermined section before and after the beat timing in accordance with each beat timing and receives a default value (a value when an effect is not added) of the intensity of the parameter in a section other than the predetermined section. A start timing of a section in which the parameter increases and decreases may be simultaneous with the beat timing or may be subsequent to the beat timing. The length of the section in which the parameter increases and decreases can be appropriately changed. The section may not occur at each beat timing, occurs once at several beat timings, or may occur twice or more between beat timings.

FIG. 3C illustrates an example of a waveform of a signal of an audio reproduced by the playback unit 51. Instead of the signal indicating the intensity of the parameter illustrated in FIG. 3B, the intensity of the parameter may be changed in accordance with the intensity of an amplitude of the signal of the audio. A signal in which a signal indicating the intensity of the parameter illustrated in FIG. 3B and the signal of the audio are mixed may be obtained and the intensity of the parameter may be changed in accordance with a waveform (for example, the intensity of an amplitude) of the signal. In this way, a certain degree of distortion or irregularity occurs in strongness or weakness of an effect associated with the addition of the effect, and thus it is possible to improve a visual effect for a viewer who watches a video.

The information indicating the start timing of the change is information indicating a start timing of a change using the beat timing as a reference. For example, a setting in which a change in an interval which is equal to, n times, or 1/n times a beat interval is started (changed) can be performed. In the case of the change in an interval equal to the beat interval, a display mode is changed for each beat interval. In the case of a beat interval which is n times (where n≥2), a display mode is changed at the interval which is n times the beat interval. Conversely, in the case of a beat interval which is 1/n times (where n≥2), a display mode is changed at the interval which is 1/n times the beat interval. From detection of a beat to detection of a subsequent beat, switching or an effect may be continuous. In this case, a first beat timing becomes a start timing of the switching or addition of an effect and a subsequent beat timing becomes a cancellation timing of the switching or the addition of the effect.

Figure 4:
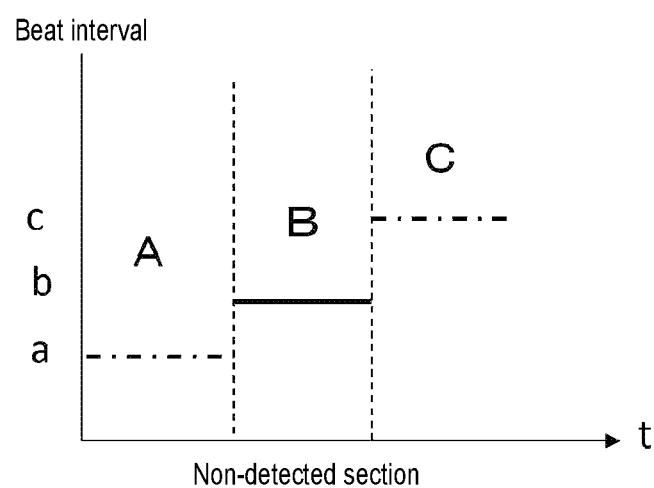
FIG. 4 is a diagram illustrating a method of determining a timing at which a display mode in a beat non-detection section is changed.

Depending on an audio, for example, there is a portion in which no beat occurs. For example, in an introductory portion of a musical piece, there is no fixed beat in many cases. Even in a section in which such a beat is not detected (a non-detection section), a start timing of the change is determined so that a change in the display mode is made. For example, as illustrated in FIG. 4, it is assumed that there is a section B in which no beat occurs between a section A in which an average value of the beat intervals is "a" and a section C in which an average value of the beat intervals is "c." In this case, the control unit 53 takes the average value "b" of the values "a" and "c" in the section B and changes the display mode at the beat interval of the average value "b."

For the non-detection section of the beat, the control unit 53 may not necessarily change the display mode. Alternatively, the control unit 53 may change the display mode based on the beat interval "a" in a section (the section A in the example of FIG. 4) before the non-detection section. Alternatively, a beat interval changed to interpolate beat intervals (the values "a" and "c" in the example of FIG. 4) before and after the non-detection section may be applied. When an introductory portion of a musical piece corresponds to a non-detection section of the beat, a beat interval is determined so that a beat interval detected for the first time in the musical piece is applied to the introductory portion and is connected to a beat timing detected for the first time.

Referring back to FIG. 2, the control unit 53 changes the display mode when a start timing of the change in the display mode determined based on the beat timing and the change information comes. For example, a case in which the playback unit 51 reproduces the first video using the VRAM 54 and reproduces the second video different from the first video using the VRAM 55 will be assumed. The second video is a switching destination video.

In this case, when the timing of the change in the display mode comes, the control unit 53 controls the switch 56 in accordance with change information (a kind of change: switching of a video) and switches a state in which an output of the VRAM 54 is connected to the display device 15 to a state in which an output of the VRAM 55 is connected to the display device 15 at a predetermined time. Thus, the display mode of the display device 15 is switched from first video display to second video display.

When the kind of change in the display mode is one of the addition of the effect, the change, and the cancellation, the control unit 53 does not perform control of the switch 56 (maintains the state in which the output of the VRAM 54 is connected to the display device 15) and performs control for addition of an effect, a change, and cancellation on the playback unit 51. For example, a value of a parameter (for example, the degree of enhancement of an edge) of a video referred to for the playback unit 51 to perform drawing on the VRAM 54 is rewritten to a value in the addition of an effect or a value in the cancellation. Alternatively, in a state in which a first effect (for example, an increase in the degree of enhancement of an edge) is exerted, the control unit 53 can cancellation the first effect (returns the degree of enhancement to an original value) and add a second effect (for example, an increase in a luminance value of the video) different from the first effect. In this way, the effect is changed. In the state in which the first effect is added, the second effect different from the first effect can be imposed in some cases. An effect can be added to a frame image drawn on the VRAM 55 for connection to the display device 15 in some cases.

User Interface

Figure 5:
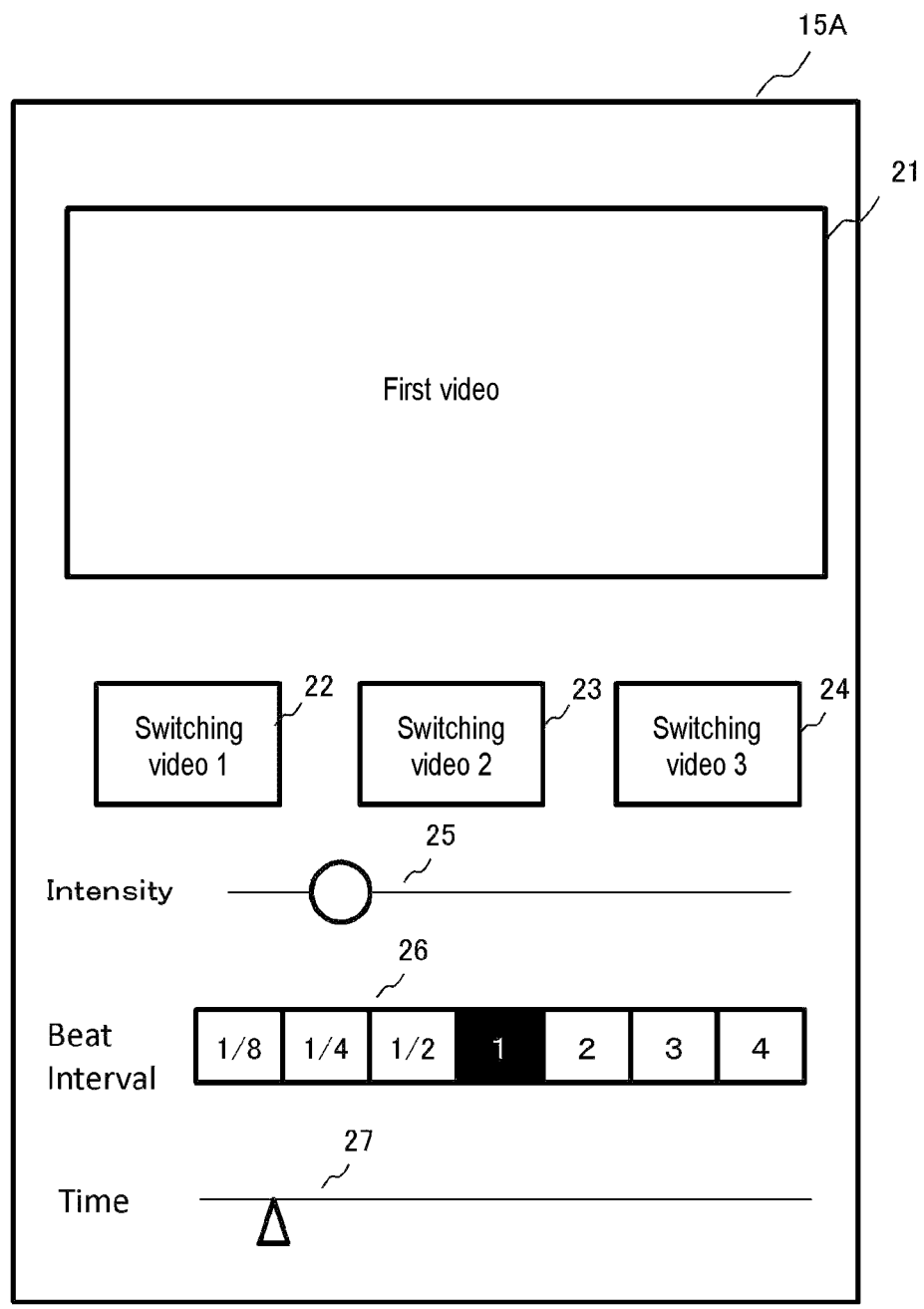
FIG. 5 is a diagram illustrating an example of a user interface (UI) of an information processing device.

FIG. 5 is a diagram illustrating an example of a user interface (UI) of an information processing device 1. FIG. 5 illustrates a screen 15A of the display device 15. The display device 15 includes a touch panel and various buttons (operators) displayed on the screen 15A serve as the input device 14. The screen 15A includes a display region 21 of a video (the first video), selection buttons 22, 23, 24 of a switching destination video (the second video), a slide button 25 for increasing or decreasing intensity of a parameter, a beat interval adjustment unit 26, and an indicator 27 indicating a playback time of the first video.

The selection buttons 22, 23, and 24 are selection buttons for videos which are switching destinations when the display mode is changed. In the example illustrated in FIG. 5, a maximum of three videos can be entered as switching destination videos. Thumbnail images or videos indicating the switching destination videos may be displayed on the selection buttons 22, 23, and 24. The slide button 25 can adjust strongness or weakness of a parameter by moving an operator (indicated by a circle) on a straight line to the right and left. In the example of FIG. 5, the intensity further increases as the operator is located further on the right side. The intensity further decreases as the operator is located on the left side. A parameter which can be assigned to the slide button 25 can be appropriately selected. In the embodiment, the degree of enhancement of an edge of a video displayed in the display region 21 can be changed by operating the slide button 25.

The beat interval adjustment unit 26 is formed by a plurality of buttons for selecting an interval at which the display mode is changed with respect to a beat interval detected by the detection unit 52. In the example illustrated in FIG. 5, a ratio to the beat interval can be selected from any of ⅛, ¼, ½, 1, 2, 3, and 4. FIG. 5 illustrates an aspect in which the same scale (1) is selected and the selected ratio is reversely displayed.

The indicator 27 indicates a time axis indicating a playback time of the video shown in the display region 21 in a straight line and displays a pointer (indicated by a triangle) which indicates a present time during the playback time and is moved on the time axis. Fast-forwarding or rewinding of a video can be realized by moving the pointer to the right or left direction through a touch panel operation.

The user can select or determine a switching destination video, the intensity of a parameter, and a timing at which the switching is executed (an execution interval) using the selection buttons 22 to 24, the slide button 25, and the adjustment unit 26. Results of the determination are stored as change information in the change information storage unit 59 (the storage device 57).

Figure 6:
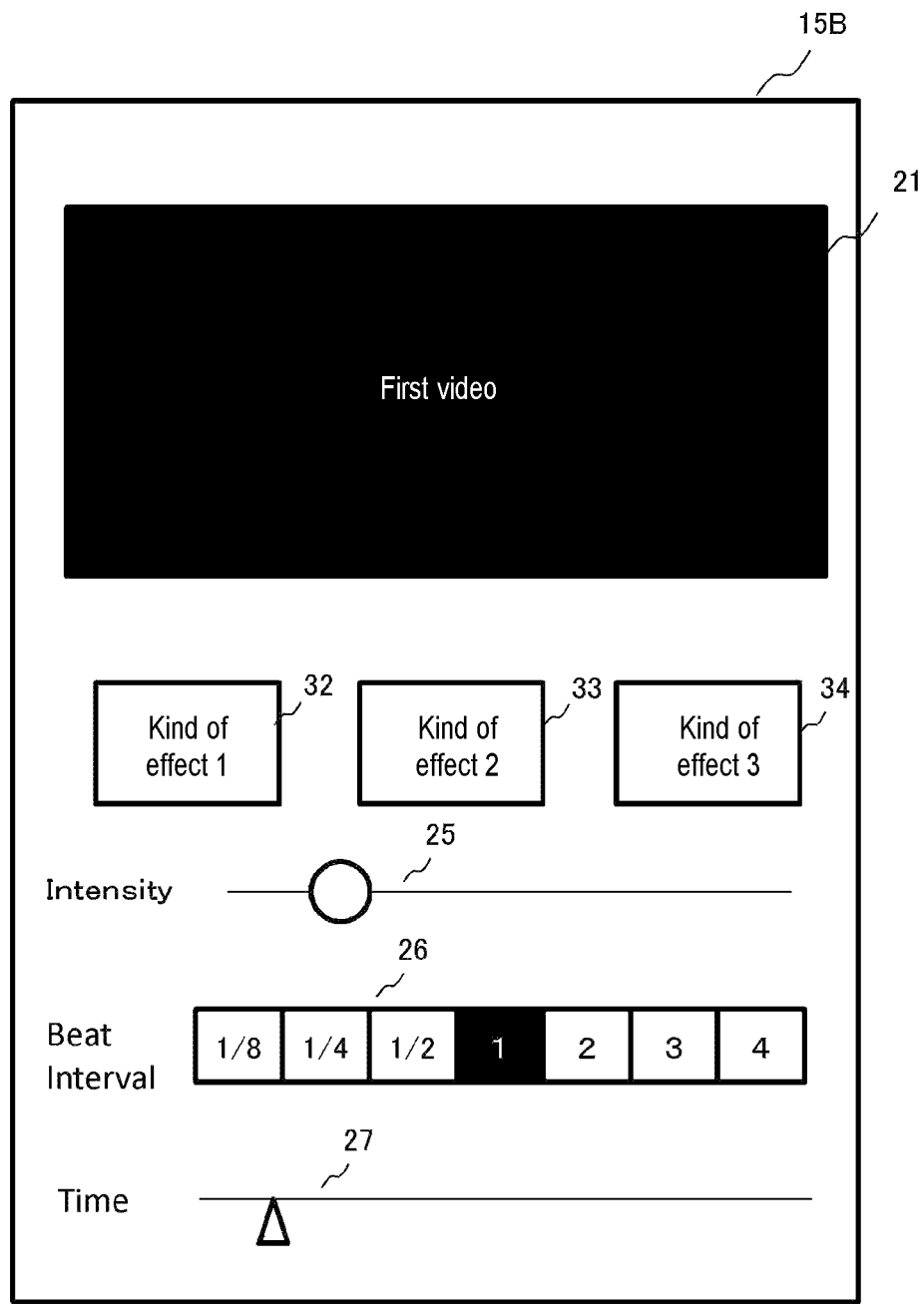
FIG. 6 is a diagram illustrating another example of a user interface (UI) of an information processing device.

FIG. 6 is a diagram illustrating another example of a user interface (UI) of an information processing device 1. A UI displayed on the screen 15A illustrated in FIG. 5 (referred to as a first UI) is a UI when switching of the video is performed as the change in the display mode. A UI displayed on a screen 15B illustrated in FIG. 6 (referred to as a second UI) is a UI when an effect is added as the change in the display mode.

As illustrated in FIG. 6, the selection buttons 22, 23, and 24 of the switching destination videos are changed to selection buttons 32, 33, and 34 for selecting kinds of effects added to a video on the screen 15B (the second UI). The display region 21, the slide button 25, the adjustment unit 26, and the indicator 27 are the same as those of the first UI (see FIG. 5).

Kinds of effects can be allocated to the selection buttons 32, 33, and 34. For example, reversion of a pixel value can be assigned to the selection button 32, posterization (a change in a gray scale) can be assigned to the selection button 33, and enhancement of an edge can be assigned to the selection button 34. Thumbnail images or videos when effects are added can be displayed on the selection buttons 32, 33, and 34. Effects of change destinations when effects are changed can also be designated using the selection buttons 32, 33, and 34. For example, an assignment target effect may be changed from reversion to a gray scale change at the changed execution timing by designating reversion as the first effect using the selection button 32 and designating the gray scale change as the second effect using the selection button 33. An image shown in the display region 21 in FIG. 6 is an image reversed from the image shown in the display region 21 illustrated in FIG. 5. As an example of another effect, a waveform of an audio may be displayed in real time to be superimposed on the video display in the display region 21.

Processing Example

Figure 7:
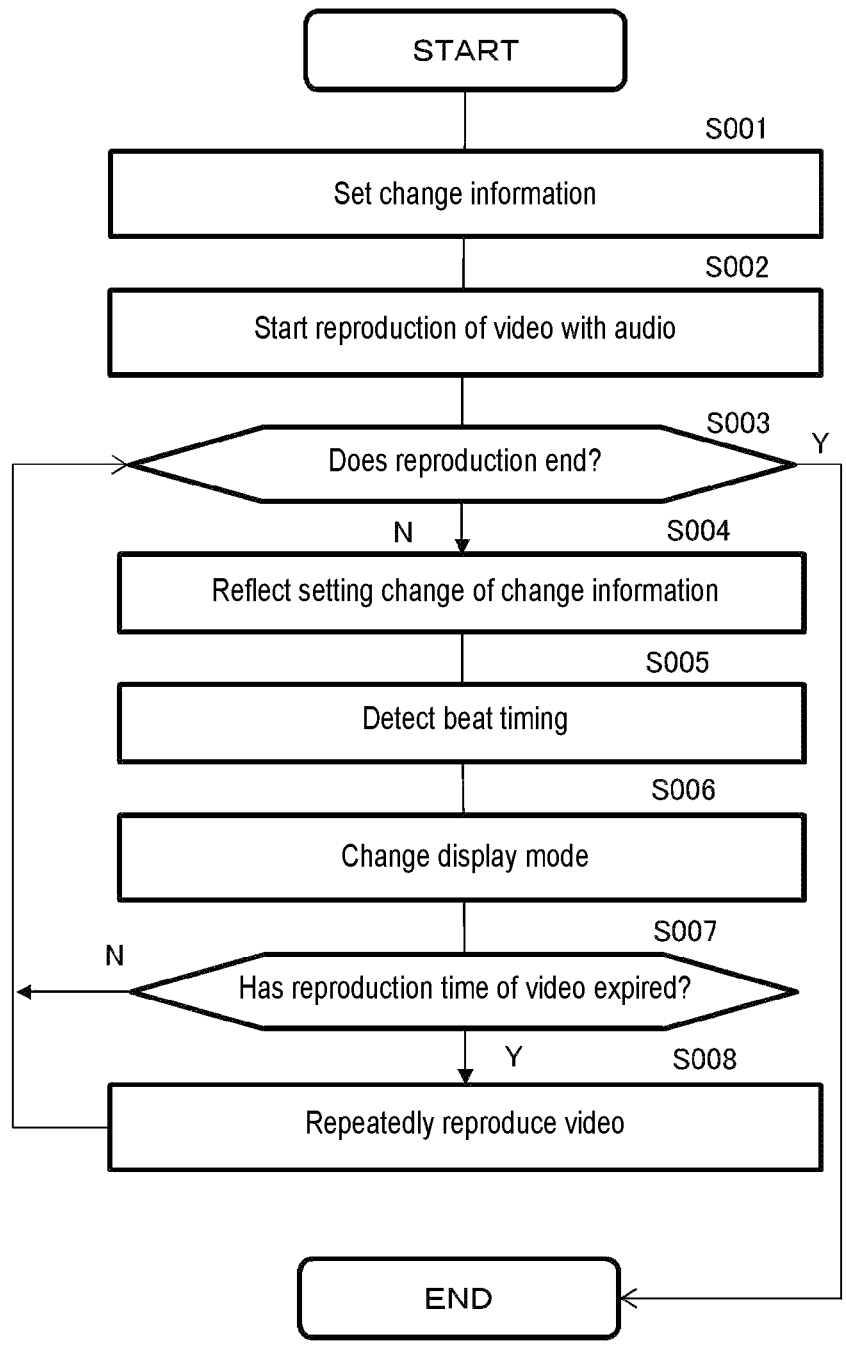
FIG. 7 is a flowchart illustrating a processing example of the video control device (the controller).

FIG. 7 is a flowchart illustrating a processing example of the controller 50. In S001, the change information is set. A user designates the video (the first video) displayed in the display region 21 of the display device 15 using the input device 14 and the display device 15. In this processing example, a video having an audio is designated as the first video. Thereafter, the CPU 10 displays a screen 15A (see FIG. 5) or a screen 15B (see FIG. 6) on the display device 15 in response to a calling operation using the input device 14 of the user. The user performs setting input of information related to the change in the display mode (the change information) using the screen 15A or the screen 15B.

Case in which Switching of Video is Performed

For example, the user specifies a video displayed in the display region 21 of the display device 15 using the input device 14. Subsequently, the user inputs designation of a switching destination video (the second video) using the selection buttons 22 to 24 of the screen 15A. The user uses the adjustment unit 26 to designate an execution timing (the execution interval) of the switching of the video. Information indicating the switching destination video or the execution interval of the switching is stored as the change information in the storage unit 59.

Thereafter, for example, when the user presses a playback button (which is displayed in the display region 21, for example) of the video having the audio, the playback unit 51 starts the process of reproducing the video having the audio (S002). At this time, the process of reproducing the switching destination video is also started in parallel to the process of reproducing the video having the audio and drawing on the VRAMs 54 and 55 is started.

The control unit 53 controls the switch 56 such that the switch 56 selects an output of the VRAM 54. On the other hand, the video from the VRAM 54 is displayed in the display region 21 of the display device 15. In the process of reproducing the video having the audio, the playback unit 51 performs a process of reproducing the audio added to the video and the audio is output from the speaker 19.

In S003, it is determined whether an instruction to end the playback of the video having the audio is given (for example, a playback end button is pushed). Here, when it is determined that the instruction to end the playback is given, the process of FIG. 7 ends. Conversely, when the instruction to end the playback is not given, the process proceeds to S004.

In S004, it is determined whether there is setting change of the change information. When there is the setting change of the change information, the setting change of the change information is reflected (the change information is overwritten). Here, the slide button 25 or the adjustment unit 26 can be operated during playback of the video. During the playback of the video, the switching destination video can be changed using the selection buttons 22, 23, and 24 and the kind of effect can also be changed using the selection buttons 32, 33, and 34. The result of the change is reflected in the change information stored in the storage unit 59 in S004 (the change information is updated). Instead of S004, a process of updating the change information associated with an operation on the first or second UI may be performed through a frequent interruption process.

The information regarding the playback time is transmitted to the detection unit 52 in association with the playback of the video having the audio. The detection unit 52 detects the beat timing by comparing the information regarding the playback time with the beat information (S005).

Information indicating the detection of the beat timing is supplied from the detection unit 52 to the control unit 53. The control unit 53 controls the switch 56 with information regarding the execution timing (the execution interval) of the change included in the change information based on the change information (the kind of change in the display mode: the switching of the video) stored in the storage unit 59 and performs switching to a state in which an output (a signal of the switching destination video) of the VRAM 55 is output to the display device 15. Thus, the switching to the video having the audio is performed, and a predetermined time and the switching destination video are displayed in the display region 21 (S006).

In S007, it is determined whether the playback time of the video has expired. This determination is performed on both the video having the audio and the switching destination video. When it is determined that the playback time of the video has expired, the playback unit 51 performs repeated playback of the video of which the playback time has expired (S008). For example, when the playback time of the video having the audio (the first video) is longer than the playback time of the switching destination video (the second video) and the playback time of the second video has expired, the repeated playback of the second video is performed as long as the playback time of the first video has not expired. When the playback time of the first video has expired and there is no setting in which the playback of the first video automatically ends, the playback unit 51 performs the repeated playback in association with the expiration of the playback time of the first video (S007 and S008). As described above, when it is determined that the playback time of the first video has expired, the playback unit 51 may not reproduce the first video and the process illustrated in FIG. 7 may end.

Case in which Addition of Effect is Performed

In the process illustrated in FIG. 7, when an effect is added as the change in the display mode, an addition target effect is designated using the selection buttons 32 to 34 of the screen 15B illustrated in FIG. 6. The intensity of the parameter is designated using the slide button 25 and an execution timing (an execution interval) of the addition of the effect is designated using the adjustment unit 26. Information regarding the designation of the addition target effect, the intensity of the parameter, and the execution interval of the addition of the effect is stored in the storage unit 59 and is referred to by the control unit 53.

When the playback unit 51 starts reproducing the video having the audio in response to an operation on the playback button by the user, an output of the VRAM 54 is connected to the display device 15 and the video is displayed in the display region 21. The control unit 53 causes the playback unit 51 to change the parameter related to drawing of a frame image of the video having the audio at the beat timing detected by the detection unit 52 and a timing based on the information indicating the execution interval of the addition of the effect included in the change information. For example, when the kind of effect is reversion, the control unit 53 changes a pixel value of the image drawn by the playback unit 51 to a value reversed from the pixel value before the addition. Thus, a video in which the pixel value is reversed is displayed for a predetermined time in the display region 21. When the kind of effect is a gray scale change, a video in which the number of gray scales is reduced is displayed for a predetermined time in the display region 21. When the kind of effect is the degree of enhancement of an edge, a video in which an edge is enhanced with the degree of enhancement of the edge set using the slide button 25 is displayed in the display region 21. The kind of effect may be changed or the added effect may be cancelled at a subsequent execution timing of the execution timing at which a certain effect is added. In the foregoing processing example, the example in which the first video is the video having the audio has been described. However, the first video may be a video based on only video and audio data may be data independent (separate) from the video. In this case, the playback unit 51 reproduces audio in accordance with (in synchronization with) the playback of the first video.

In the foregoing embodiment, the example in which the controller 50 is configured using the CPU 10 and the storage device 57 has been described. The CPU 10 is an example of a processor and a process performed by the processor may be performed by a plurality of CPUs (processors) or may be performed by a CPU which has a multicore configuration. A process performed by the processor may be performed by a processor (a digital signal processor (DSP), a graphical processing unit (GPU), or the like) other than the CPU, an integrated circuit (an application specific integrated circuit (ASIC), a field programmable gate array (FPGA), or the like) other than the processor, or a combination of the processor and the integrated circuit (a micro processing unit (MPU), a system-on-a-chip (SoC), or the like).

Operational Effects of First Embodiment

In the embodiment, based on the beat timing of the audio and the change information related to the change in the display mode of the video displayed in the display device 15, the display mode of the video displayed in the display region 21 of the display device 15 is automatically changed (for example, the video is changed or the effect is added). Thus, as in the related art, it is possible to achieve a reduction in a work load for displaying an aspect of the change in the display mode of the video in the display region 21 in accordance with a beat of an audio.

Second Embodiment

In the first embodiment, a beat timing for an audio is determined in advance, is stored as beat information in the storage unit 58, and is used by the detection unit 52 to detect the beat timing. In a second embodiment, a beat timing detection method in which the detection unit 52 can detect a beat timing from a signal of an audio in real time will be described.

First Method

A first beat timing detection method (a first method) includes generating timing information for governing a beat of an input musical piece and a plurality of pieces of intensity data indicating power at that timing from data of the musical piece, calculating a period and a phase of the beat of the musical piece using the plurality of pieces of intensity data, and detecting a timing at which a beat sound is generated based on the period and the phase of the beat of the audio. In the first method, a beat timing detection device is used which include a generation unit that generates timing information for governing a beat of the input musical piece and the plurality of pieces of intensity data indicating power at that timing from data of the musical piece, a calculation unit that calculates a period and a phase of the beat of the musical piece using the plurality of pieces of intensity data, and a detection unit that detects a timing at which a beat sound is generated based on the period and the phase of the beat of the audio.

The beat timing detection device may further include a playback processing unit that performs a process of reproducing the beat sound in accordance with the timing at which the beat sound is generated.

In the beat timing detection device, the calculation unit may determine beats per minute (BPMs) with regard to the plurality of pieces of intensity data based on the timings indicated by the plurality of pieces of intensity data, calculate a period of the BPM as a period of the beat, and calculate a relative position of the timing at which the beat sound is generated in a sine wave indicating the BPM as a phase of the beat. The detection unit may obtain a count value indicating the period of the beat and the phase of the beat, measure the count value using a counter incremented for each sample of a sampling rate, and detect a timing at which a value of the counter reaches the count value as the timing at which the beat sound is generated.

In the beat timing detection device, the calculation unit may calculate, as the period of the beat, a period of the BPM when a value of Fourier-transformed data obtained through Fourier transform performed on each of the plurality of pieces of intensity data and each of the plurality of BPMs is maximum.

In the beat timing detection device, when the Fourier-transformed data is obtained with regard to each of the plurality of pieces of intensity data and a first BPM of the plurality of BPMs, the calculation unit may acquire the Fourier-transformed data of at least one second BPM that has a frequency of an integer multiple of a frequency of the first BPM and use a value obtained by adding a value of the Fourier-transformed data calculated using the first BPM and a value of the Fourier-transformed data calculated using the second BPM at a predetermined ratio, as a value of the Fourier-transformed data with regard to the first BPM.

In the beat timing detection device, the generation unit may perform a process of acquiring a frame formed by a predetermined number of continuous audio samples from data of the input musical piece, decimating the samples in the frame, performing fast Fourier transform on the decimated samples, and obtaining data indicating a total sum of power of each frequency bandwidth obtained through fast Fourier transform at a predetermined interval, and may extract, as the intensity data, data indicating the total sum of the power when a state in which the data indicating the total sum of the power indicating a value larger than an own value does not appear continues for a predetermined time.

Configuration of Beat Timing Detection Device

The information processing device 1 illustrated in FIG. 1 can be applied to the beat timing detection device. The CPU 10 performs a process of detecting a beat timing of an audio (generating a timing at which a beat sound is generated) by executing a program stored in the storage device 57.

Figure 8:
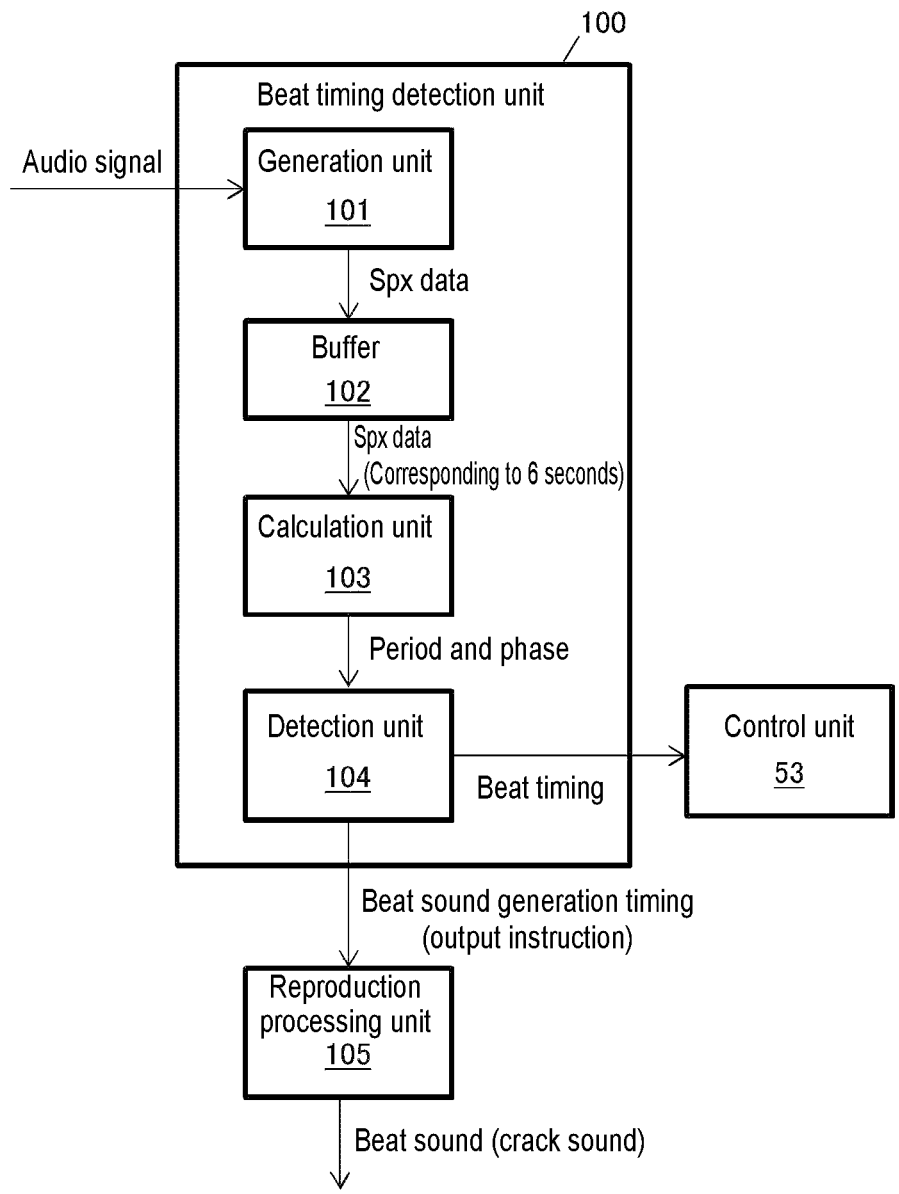
FIG. 8 is a diagram illustrating a configuration example of a beat timing detection unit.

FIG. 8 is a diagram illustrating a configuration example of a beat timing detection unit. The CPU 10 operates as a beat timing detection unit 100 illustrated in FIG. 8 by executing a program. The beat timing detection unit 100 is included in the detection unit 52 in the first embodiment. Alternatively, the beat timing detection unit 100 can be substituted with the detection unit 52.

The beat timing detection unit 100 includes a generation unit 101 for a time sparse data (also written as "Spx data": corresponding to intensity data), a buffer 102, a calculation unit 103 for period data and phase data, and a detection unit 104 for a beat timing. The control unit 53 (see FIG. 1) is notified of the beat timing. The control unit 53 uses the beat timing to change the display mode (control the video). Since an operation and a process of the control unit 53 have been described in the first embodiment, repeated description thereof will be omitted. The beat timing is input as a beat sound generation timing (an output instruction) to a playback processing unit 105 for a beat sound. The playback processing unit 105 performs a process of reproducing a beat sound in accordance with a generation timing. An operation of the playback processing unit 105 is performed by, for example, the CPU 10. The buffer 102 is provided in, for example, a predetermined storage region of the RAM 12 or the HDD 13.

The generation unit 101 for the Spx data generates the Spx data using digital data indicating a sound of a musical piece and outputs the Spx data. The buffer 102 accumulates the Spx data corresponding to at least a predetermined time (corresponding to a plurality of pieces of intensity data). In the embodiment, 6 seconds is exemplified as the predetermined time, but the predetermined time may be longer or shorter than 6 seconds. The calculation unit 103 calculates period data and phase data of a beat using a set of the Spx data corresponding to the predetermined time accumulated in the buffer 102. The detection unit 104 for the generation timing detects a beat timing using the period data and the phase data.

Generation of Spx Data

Generation of the Spx data by the generation unit 101 will be described. A digital signal indicating an audio of musical piece data (data transmitted to the D/A 17 to output an audio) related to the playback is input to the generation unit 101. The digital signal indicating a sound (a musical piece signal) may be a digital signal obtained through a process of reproducing the musical piece data stored in the HDD 13 or a digital signal obtained through A/D conversion from an audio signal collected by the MIC 21.

The digital data indicating the sound is stored in the RAM 12 to be used for a process of the generation unit 101. The digital data indicating the sound is a set of sample (specimen) data collected at a predetermined sampling rate from an analog signal (normally, a voltage value of the analog signal). In the embodiment, for example, the sampling rate is assumed to be 44100 Hz. Here, the sampling rate can be appropriately changed as long as a desired FFT resolution can be obtained.

Figure 9:
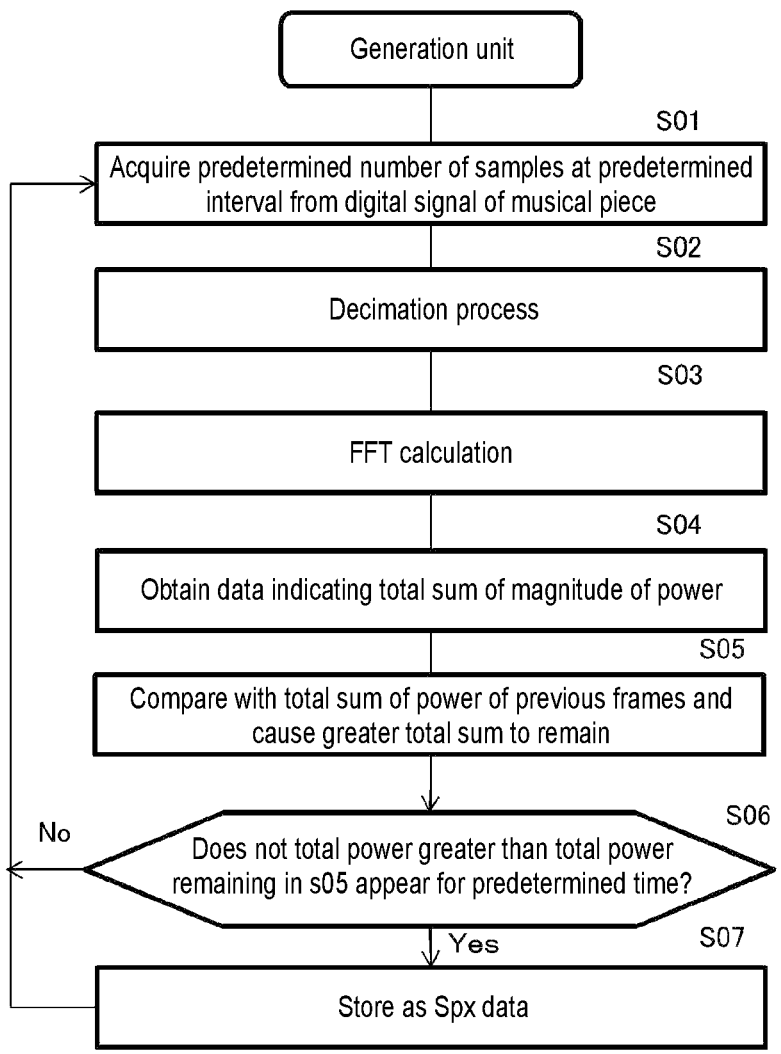
FIG. 9 is a flowchart illustrating a processing example of a generation unit.

FIG. 9 is a flowchart illustrating a processing example of the generation unit 101. Digital data (digital signal) indicating a sound of a musical piece and transmitted to the D/A 17 to output (reproduce) the musical piece is input to the generation unit 101. The generation unit 101 acquires a predetermined number of samples (referred to as "frames") from the input digital data (S01). The predetermined number of samples is 1024 in the embodiment, but may be greater or less than 1024. The samples are acquired at a predetermined interval. The predetermined interval is, for example, 5 ms, but may be greater or less than 5 ms.

In S02, the generation unit 101 performs a decimation process. That is, the generation unit 101 performs ¼ decimation on the 1024 samples to obtain 256 samples. Another decimation may be performed other than the ¼ decimation.

In S03, the generation unit 101 performs fast Fourier transform (FFT) on 256 samples to obtain data indicating magnitude of power in units of frames (referred to as power data) from a result of the FFT (power of each frequency bandwidth) (S04). Since the power is represented by a square of an amplitude, the concept "power" also includes an amplitude.

The power data is, for example, a total sum of power obtained by performing FFT on the 256 samples. Here, when a value obtained by subtracting power of a corresponding bandwidth in a previous frame from power of each frequency bandwidth of a current frame is positive (the power increases), the value of the power remains for calculating the total sum. The other values (the subtracted value is negative (the power decreases)) may be ignored. This is because there is a high possibility of a portion with a large increase in the power being a beat.

As long as comparison targets with other frames are the same, a value used to calculate the total sum may be a total sum of power of the current frames, may be a total sum of power of positive values which are values obtained by subtracting power of previous frames from power of current frames, or may be a difference obtained by subtracting power of previous frames from power of current frames. In a power spectrum obtained by performing FFT, the foregoing difference may be calculated with regard to only a frequency lower than a predetermined frequency. A frequency equal to or greater than the predetermined frequency may be cut using a lowpass filter.

The power data is stored in the RAM 12 or the HDD 13 in units of frames. Whenever power data is generated in units of frames, the generation unit 101 compares the magnitude of the total sum (peak values) of the power, causes greater magnitude to remain, and discard less magnitude (S05). The generation unit 101 determines whether the total sum greater than the total sum remaining in S05 does not appear for a predetermined time (S06). The predetermined time is, for example, 100 ms, but may be greater or less than 100 ms. When the state in which the data indicating the greater total sum does not appear continues for a predetermined time, the generation unit 101 extracts data indicating the total sum of the power as the Spx data and stores (preserves) the data in the buffer 102 (S07). In this way, the Spx data is data obtained by extracting a peak value of the digital data indicating the musical piece at a 100 ms interval and is information indicating a timing for governing a beat of the musical piece (timing information) and data indicating power at that timing. The plurality of pieces of Spx data is accumulated in the buffer 102. The generation unit 101 repeatedly performs the processes from S01 to S06.

Figure 10A:
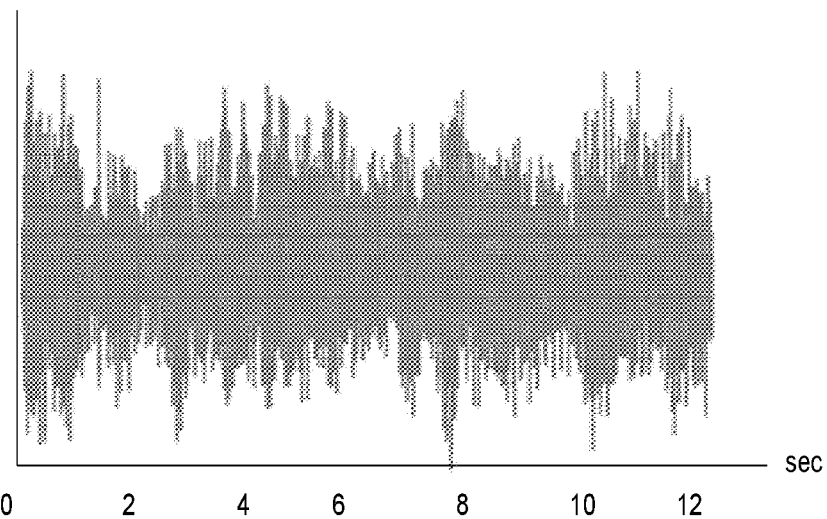
FIG. 10A is a diagram illustrating an example of a digital signal of a musical piece (also referred to as a musical piece signal) corresponding to 12 seconds input to a generation unit and FIG. 10B is a diagram illustrating an example of Spx data generated from the musical piece signal of FIG. 10A.
Figure 10B:
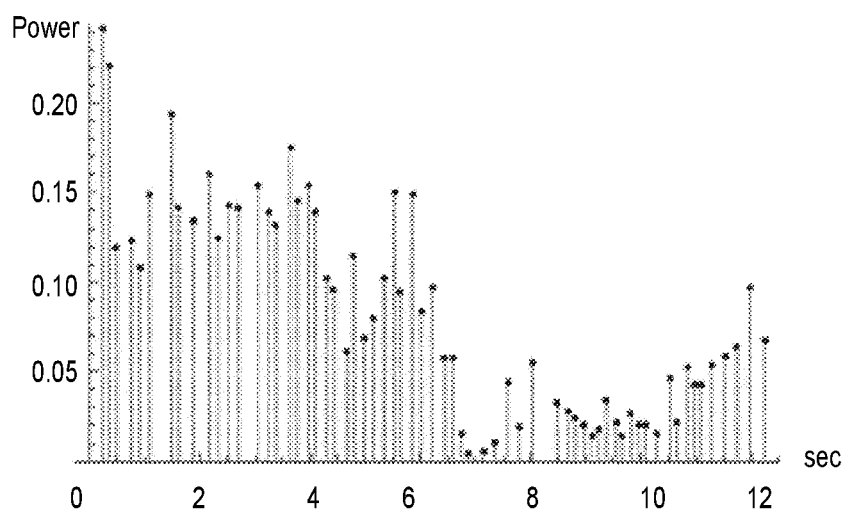

FIG. 10A is a diagram illustrating a digital signal of a musical piece corresponding to 12 seconds input to the generation unit 101 and FIG. 10B is a diagram illustrating an example of the Spx data generated from the digital signal of the musical piece of FIG. 10A. In a graph illustrated in FIG. 10B, the horizontal axis represents a time and the vertical axis represents power. In the graph, a vertical line with a black circle at the upper end indicates individual Spx data obtained from the digital signal of the musical piece illustrated in FIG. 10A, a position on the horizontal axis (the time axis) indicates a timing, and the length of the vertical line indicates the power. About ten pieces of Spx data are generated for 1 second when the Spx data is generated at the 100 ms interval.

Calculation of Period Data and Phase Data

Figure 11:
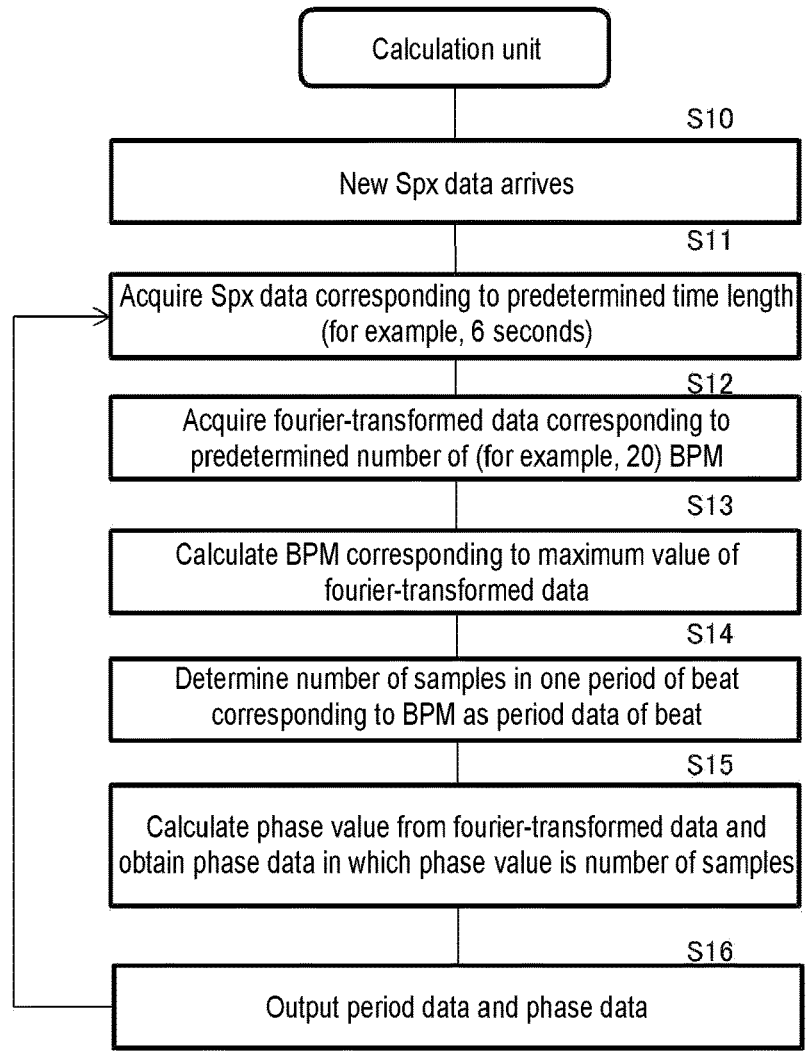
FIG. 11 is a flowchart illustrating a processing example of a calculation unit.

FIG. 11 is a flowchart illustrating a processing example of the calculation unit 103. In S10, new Spx data generated in the generation unit 101 arrives and stored in the buffer 102. In S11, the Spx data corresponding to a predetermined time (corresponding to the plurality of pieces of intensity data) in the Spx data accumulated in the buffer 102 is acquired from the buffer 102. The predetermined time is, for example, 6 seconds, but may be longer or shorter than 6 seconds as long as the period and the phase of the beat can be obtained. The subsequent processes of S12 to S16 are process performed using the Spx data corresponding to 6 seconds and acquired in S11. In S12, Fourier transform corresponding to a predetermined number of (for example, 20) beats per minute (a BPM: tempo (a rhythm speed)) is performed on the Spx data corresponding to 6 seconds to calculate the period (one period of the BPM) of the beat and the phase (a generation timing of a beat sound) of the beat.

Specifically, a sum of products with regard to Exp($2\pi j f t$) (a sine wave vibrating at a BPM frequency: the amplitude is the same regardless of a frequency) is taken at a frequency (BPM frequency) f={86, 90, 94, ..., 168}/60 corresponding to a predetermined number of, for example, 20 BPMs corresponding to BPM 86 to 168, in the Spx data corresponding to 6 seconds. That is, Fourier transform is performed. A result of the Fourier transform is assumed to be Fourier-transformed data c(i) (where i=0, 1, 2, 3, ..., 19).

Figure 12:
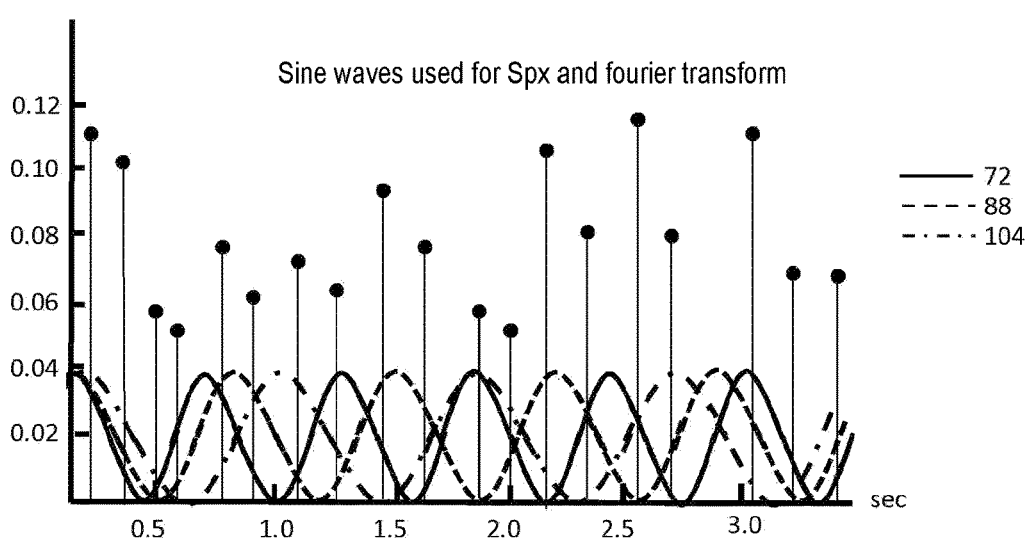
FIG. 12 is a diagram illustrating an example of a sine wave with a BPM used for Fourier transform and the Spx data.

FIG. 12 is a diagram illustrating an example of a sine wave with a BPM frequency used for Fourier transform and the Spx data. In the example of FIG. 12, a sine wave of BPM 72 (indicated by a solid line), a sine wave of BPM 88 (indicated by a dotted line), and a sine wave of BPM 104 (indicated by a one-dot dashed line) are exemplified. A value of the Fourier-transformed data c(i) is obtained by the following Expression 1. The values of the BPMs and the number of the BPMs can be appropriately changed.

[Math. 1]

$$c(i) = \sum_{k=1}^{M} x(t(k)) \mathrm{Exp}(2\pi j f(i) t(k)) \quad (1)$$

Here, t(k) in Expression 1 is a time position in past 6 seconds in which there is the Spx data and a unit is a second. Here, k is an index of the Spx data and k=1, ..., M (where M is the number of pieces of Spx data). In addition, x(t(k)) indicates a value of the Spx data (the magnitude of a peak value) at that moment. Here, j is an imaginary unit (where $j^2=-1$). In addition, f(i) is a BPM frequency. For example, BPM 120 is 2.0 Hz.

The calculation unit 103 determines the BPM in which an absolute value of c(i)=(c0, c1, c2, c3, ..., c19) corresponds to a maximum value as the BPM of the Spx data (beat) (S13). The phase value (Phase) $\phi$=Arg(c(i)) [rad] is assumed to be a beat timing of the Spx data corresponding to 6 seconds. The beat timing indicates a relative position of a beat arriving periodically to the beat generation timing.

The phase value $\phi$ is an angle of declination of a complex number. When c=$c_{re}$+j$c_{im}$ (where $c_{re}$ is a real part and $c_{im}$ is an imaginary part), the phase value $\phi$ can be obtained by the following Expression 2.

[Math. 2]

$$\mathrm{Arg}(c(i)) = \begin{cases} \mathrm{ArcTan}\!\left(\dfrac{c_{im}}{c_{re}}\right) & c_{re} \geq 0,\ c_{im} \geq 0 \\ \mathrm{ArcTan}\!\left(\dfrac{c_{im}}{c_{re}}\right) + \pi & c_{re} < 0 \\ \mathrm{ArcTan}\!\left(\dfrac{c_{im}}{c_{re}}\right) + 2\pi & c_{re} \geq 0,\ c_{im} < 0 \end{cases} \quad (2)$$

When the phase value φ is calculated, a relative position of the beat generation timing to the sine wave of the BPM can be known, that is, it can be known how much the beat generation timing is delayed at one period of the BPM.

Figure 13:
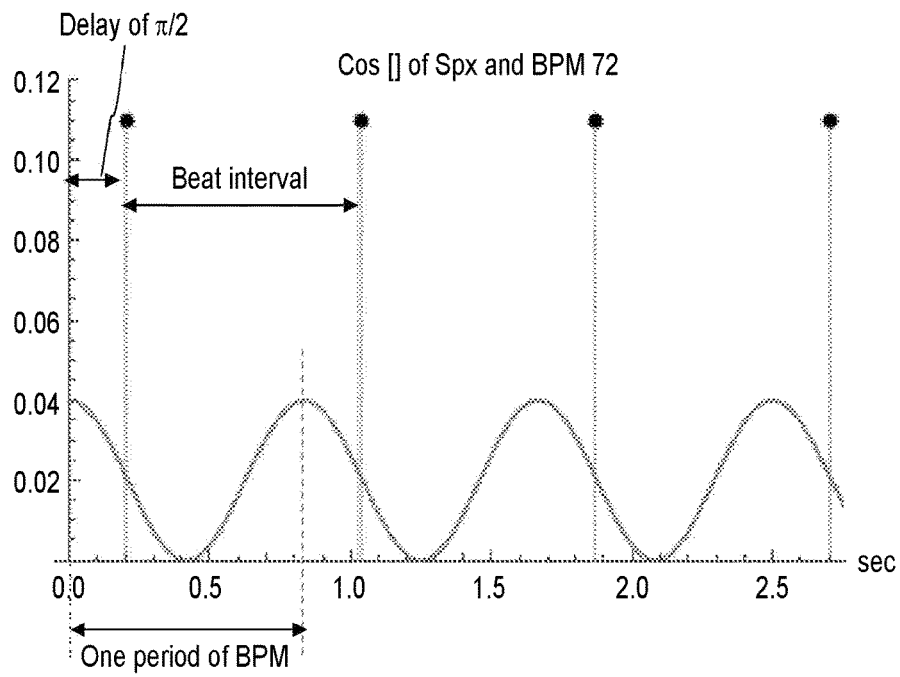
FIG. 13 is a diagram illustrating a relation between a cosine wave indicating the BPM and a beat generation timing.

FIG. 13 is a diagram illustrating a relation between a cosine wave indicating the BPM (the real part of Exp(2πjft)) indicating the BPM and a beat generation timing. In an example illustrated in FIG. 13, the number of pieces of Spx data is 4 and the BPM is 72. Each piece of Spx data illustrated in FIG. 13 is a value (phase) of c(i) obtained using Expression 2 and indicates the beat generation timing. A gap between the pieces of Spx data is an interval of the beat generation timing. In the example illustrated in FIG. 13, a timing delayed by π/2 from a cosine wave with the BPM frequency obtained by calculating the phase value φ is a beat generation timing. The calculation unit 103 sets the number of samples in one period of the BPM as period data (S15).

For example, when the BPM is 104 and a sampling rate is 44100 Hz, the period data (the number of samples) is 44100 [number]/(104/60)=25442 [number]. When the period data is 25442 [number] and the phase value φ is 0.34 [rad], the phase data (the number of samples) is 25442 [number]×0.34 [rad]/2π[rad]=1377 [number]. Then, the calculation unit 103 outputs the period data and the phase data (S16). The calculation unit 103 repeatedly performs the processes of S11 to S16 whenever the Spx data corresponding to 6 seconds is accumulated. Thus, it is possible to follow a change in a rhythm of a musical piece.

Detection of Beat Timing

Figure 14:
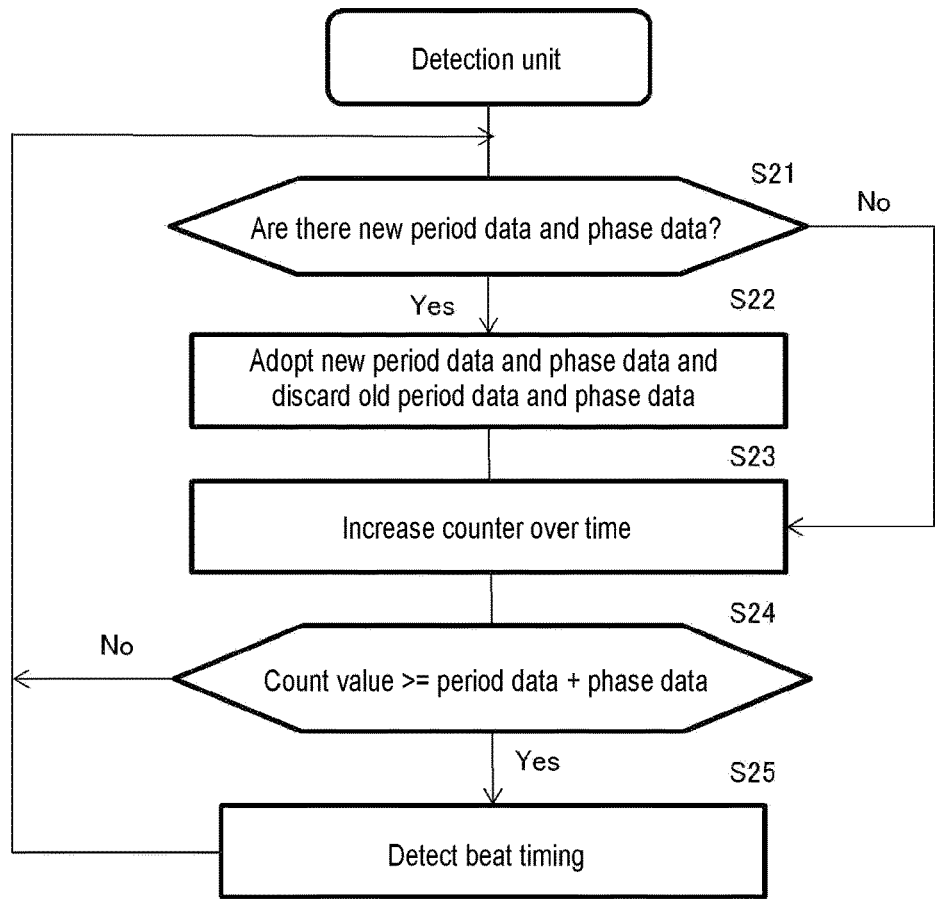
FIG. 14 is a flowchart illustrating an example of a process of detecting a beat generation timing in a detection unit.

FIG. 14 is a flowchart illustrating an example of a process of detecting a beat timing in the detection unit 104. In S21, the detection unit 104 determines whether the calculation unit 103 supplies the new period data and phase data. When the new period data and phase data are supplied, the process proceeds to S22. Otherwise, the process proceeds to S23.

In S22, the detection unit 104 adopts the new period data and phase data to detect a beat generation timing and discards the old period data and phase data. At this time, when the Spx data is generated, samples of frames forming the Spx data is in a state in which a delay of 100 ms is given. Therefore, here, time adjustment (phase adjustment) is performed so that a musical piece and a rhythm which are being performed or reproduced match a hand clapping sound to be described. Thereafter, the process proceeds to S23.

In S23, a counter is set using the number of samples of the period data and the number of samples of the phase data. For example, the detection unit 104 includes the counter that counts up (increases) for each sample of a sampling rate (an interval of a voltage check of an analog signal in accordance with the sampling rate) and increases the count value of the counter for each sample. Thus, it is awaited until the count value becomes from zero to a predetermined value or more (a value indicating a sum of the number of samples (a count value) of phase data and the number of samples (a count value) of the period data) (S24).

When the count value of the counter becomes the predetermined value or more, the detection unit 104 detects a generation timing of a beat sound (a beat timing) based on prediction (S25). The detection unit 104 notifies the control unit 53 of generation of the beat timing and outputs an instruction to output the beat sound (S25). Based on the beat timing, the control unit 53 performs the operation (the change in the display mode) describe in the first embodiment. The playback processing unit 105 transmits digital data of a beat sound (for example, a hand clapping sound) stored in advance in the ROM 11 or the HDD 13 to the D/A 17 in response to an output instruction. The digital data is converted into an analog signal by the D/A 17, the amplitude of the analog signal is amplified by the AMP 18, and subsequently the amplified analog signal is output from the speaker 19. Thus, the hand clapping sound on which the musical piece which is being performed or reproduced is superimposed is output.

According to the first method, a (past) musical piece of which performance or playback has ended is input to the generation unit 101. The generation unit 101 generates the Spx data. The Spx data is accumulated in the buffer 102, the calculation unit 103 calculates the period and the phase of the beat from the plurality of pieces of Spx data corresponding to a predetermined time (6 seconds), and the detection unit 104 detects and outputs a beat timing in accordance with the musical piece (audio) which is being reproduced or performed. Thus, the control unit 53 can change the display mode based on the beat timing. The hand clapping sound matching the rhythm of the musical piece which is being performed or reproduced by the playback processing unit 105 can be output. An automatic output of the hand clapping sound can be performed by a simple algorithm with a small calculation amount, such as generation of the above-described Spx data, calculation of the period and the phase of the beat based on the Fourier-transformed data, and counting of the counter value. Thus, it is possible to avoid an increase in a load on an entity (the CPU 10) that performs the process or an increase in memory resources. Since the processing amount is small, it is possible to output a clapping sound without a delay of a reproduced sound or a performed sound (although there is a delay, people cannot the delay).

Since the process performed by the beat timing detection unit 100 is also performed by a plurality of CPUs (processors), the process may be performed by a CPU that has a multicore configuration. The process performed by the beat timing detection unit 100 may be performed by a processor (a DSP, a GPU, or the like) other than the CPU 10, an integrated circuit (an ASIC, an FPGA, or the like) other than the processor, or a combination of the processor and the integrated circuit (an MPU, an SoC, or the like).

Modification Examples of First Method

Figure 15:
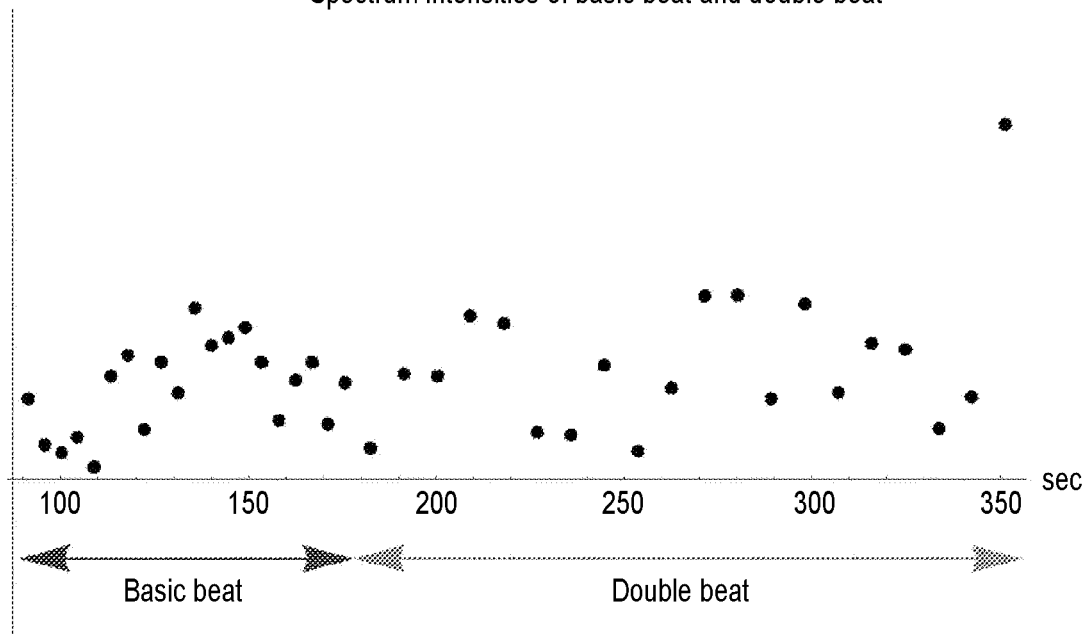
FIG. 15 is a diagram illustrating a spectrum intensity of a single (basic beat) and double beat.

In the above-described embodiment, the example in which BPM 86 to BPM 168 used to calculate the period data are used as the BPMs has been described. An absolute value (a spectrum intensity) of c (i) is obtained with regard to not only BPM 86 to 168 (each of which corresponds to a first BPM) but also double BPM 172 to BPM 336 or a quadplex BPM 344 to BPM 672 (corresponding to at least one second BPM with a frequency which is an integer multiple of a frequency of the first BPM). FIG. 15 is a diagram exemplifying a spectrum intensity of a single (basic beat) and double beat. A value obtained by adding a spectrum intensity related to each of one time, double, and quadplex by a predetermined ratio is used to determine a BPM. For example, a numerical value obtained by adding a spectrum intensity of BPM 91 (which is an example of the first BPM) and spectrum intensities of BPM 182 and BPM 364 (which are examples of at least one second BPM) by a ratio of 0.34: 0.33:0.33 is used as an absolute value of c (i) with regard to BPM 91.

Depending on a musical piece, power of a BPM corresponding to a finder eighth note or sixteenth note is greater than that of a basic beat symbolized by a fourth note. Therefore, by reflecting double or quadplex power in the intensity of the basic beat, it is possible to select a better BPM. In the foregoing example, double and quadplex have been exemplified as examples of the integer multiple, but the same advantages can be obtained with triple, five times, or more. The configurations described in the embodiment can be appropriately combined without departing from the gist of the present invention.

Second Method

Hereinafter, a second beat timing detection method (a second method) will be described. In the second beat timing detection method (the second method), the beat timing detection unit 100 performs a process of generating timing information for governing a beat of an input audio and intensity data indicating power at that timing from the data of the audio, a process of calculating a period and a phase of the beat of the audio using the intensity data, and a process of detecting a beat timing based on the period and the phase of the beat. The second method is an improvement of the first method. The second method is the same as the first method in generation of the Spx data, but is different from that in calculation of the period data and the phase data as follows.

Figure 16:
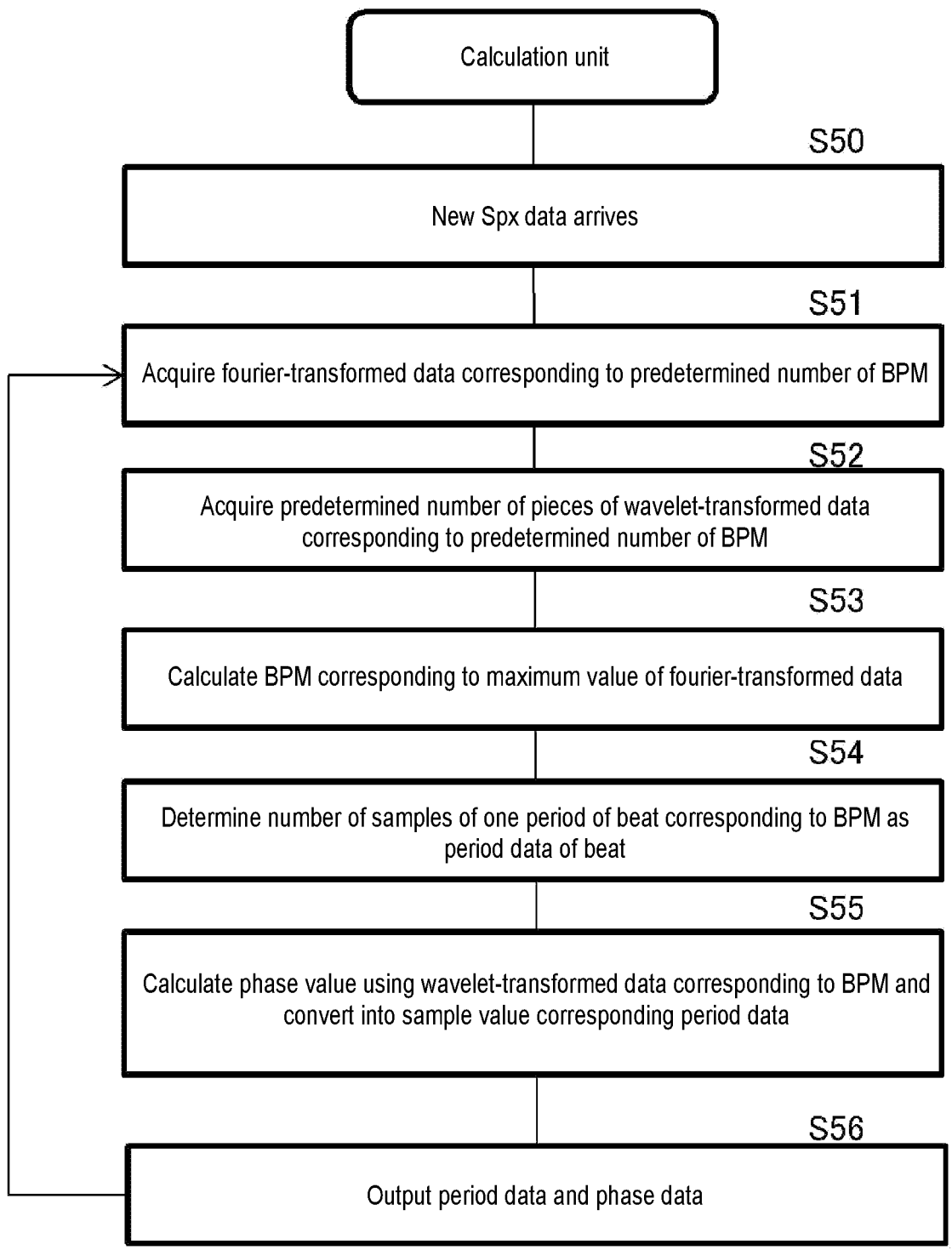
FIG. 16 is a flowchart illustrating an example of a process of calculating period data and phase data in a second beat timing detection method.

FIG. 16 is a flowchart illustrating an example of a process of calculating period data and phase data in a second beat timing detection method. In S50, new Spx data generated by the generation unit 101 arrives at the buffer 102.

In S51, the calculation unit 103 obtains Fourier-transformed data corresponding to a predetermined number of BPMs. In the first method, in the calculation of the period data and the phase data, Fourier transform corresponding to a predetermined number of (for example, 20 to 40) beats per minute (a BPM: tempo (a rhythm speed)) is performed on the Spx data corresponding to 6 seconds (see S12 of FIG. 11).

On the other hand, in the second method (S51), Fourier transform that has an attenuation term $U^k$ is used instead of Fourier transform used for the first method. A Fourier transform expression (Expression 3) is as follows.

[Math. 3]

$$\hat{f}_n(m) = \sum_{k=0}^{\infty} (Ue^{-j\omega_m})^k f(n-k) = Ue^{-j\omega_m} \hat{f}_{n-1}(m) + f(n) \qquad (3)$$

Figure 17:
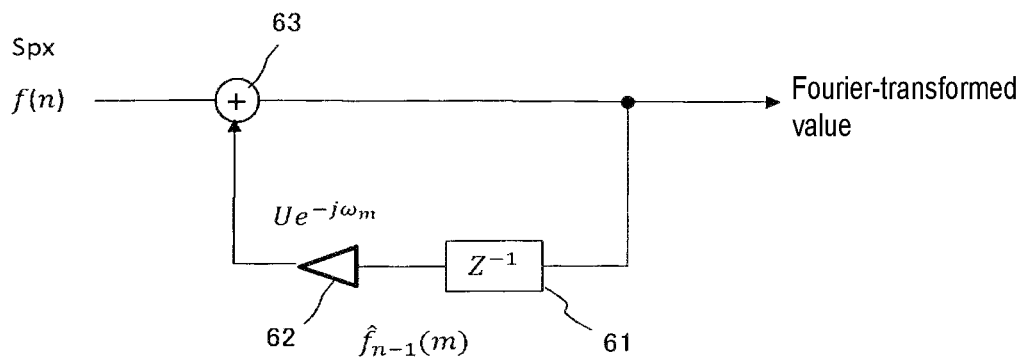
FIG. 17 is a circuit diagram of Expression 3.

In Expression 3, U indicates an attenuation amount per sample and is a number close to 1. U indicates a ratio of oblivion of past data. A section is up to past infinite. FIG. 17 is a circuit diagram of Expression 3. A multiplier 62 multiplies a past signal $f_{n-1}(m)$ in which a delay is given by a current delay block ($Z^{-1}$) 61 by an attenuation term $Ue^{-j\omega m}$ and an adder 63 adds a multiplied result to a current signal f(n). In this way, a Fourier-transformed value per sample can be obtained.

The Fourier-transformed value of Expression 3 can be expressed as in the following Expressions 4 and 5.

[Math. 4]

$$\hat{f}_n(m) = q_m \hat{f}_{n-1}(m) + f(n) \qquad (4)$$

$$q_m = Ue^{-j\omega_m} \qquad (5)$$

In a section (an empty section) in which L (where L is a positive integer) samples pass without arrival of a value of the Spx data, a Fourier-transformed value corresponding to the L samples can be obtained using the following Expressions 6 and 7 without using Expression 3 (the circuit illustrated in FIG. 17). In Expression 6, a $q_m^L$ value can be obtained simply using Expression 7. In addition, f(n) is a value of the Spx data, L is an arrival interval of the Spx data, U is an attenuation coefficient, and $\omega_m$ is an angular frequency per sample corresponding to the BPM.

[Math. 5]

$$\hat{f}_n(m) = q_m^L \hat{f}_{n-L}(m) + f(n) \qquad (6)$$

$$q_m^L = U^L e^{-j\omega_m^L} \qquad (7)$$

Figure 18:
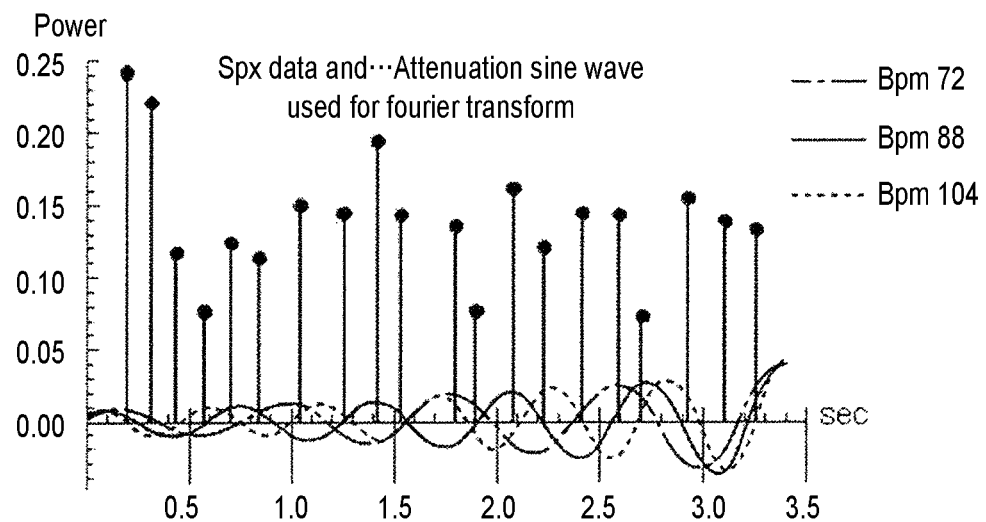
FIG. 18 is a diagram illustrating an example of an attenuation sine wave that has a BPM frequency used for Fourier transform of Expression 3 and Spx data.

FIG. 18 is a diagram illustrating an example of an attenuation sine wave that has a BPM frequency used for Fourier transform of Expression 3 and the Spx data. In the example of FIG. 18, a wave with the longest period is a wave of BPM 72, a wave with the next longest period is a wave of BPM 88, and a wave with the shortest period is a wave of BPM 104. In the second method, a predetermined plural number of BPMs (for example, 20) is prepared and a Fourier-transformed value is obtained using the foregoing Expression 3 for each BPM. The number of BPMs may be greater or less than 20.

In the second method, unlike the first method, it is not necessary to accumulate the Spx data corresponding to a predetermined period (6 seconds). Therefore, it is possible to efficiently utilize a storage region of a memory (the storage device 57) that accumulates the Spx data. In the first method, a sum of products of the plurality of BPMs×the number of pieces of Spx data is performed. In the second method, since the calculation is performed on each BPM using Expression 3, it is possible to considerably reduce a calculation amount.

Figure 19:
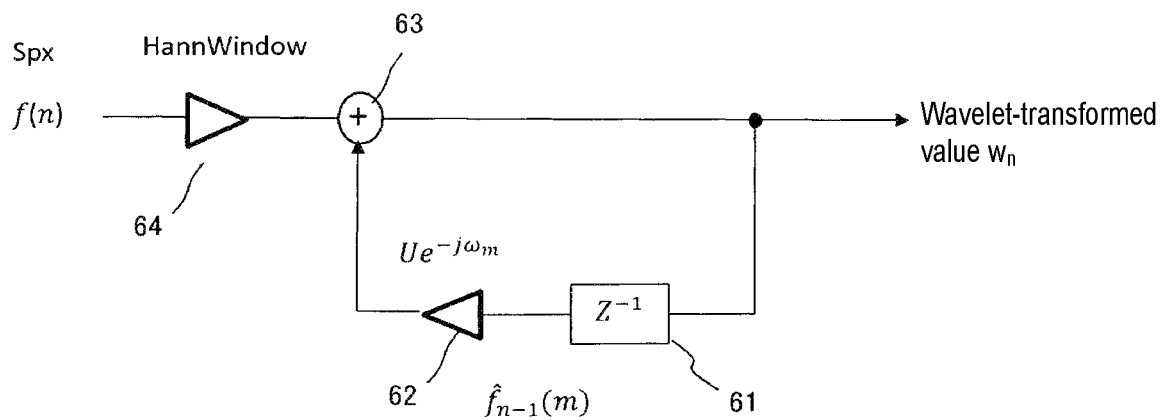
FIG. 19 is a diagram schematically illustrating a circuit for calculating a wavelet-transformed value $w_n$.

In S52, the calculation unit 103 obtains a predetermined number of (for example, 5) wavelet-transformed values corresponding to a predetermined number of (for example, 20) BPMs. FIG. 19 is a diagram schematically illustrating a circuit for calculating a wavelet-transformed value $w_n$. The circuit has a configuration in which a multiplier 64 is added to the circuit for calculating a Fourier-transformed value, as illustrated in FIG. 17. The multiplier 64 multiplies a periodic Hannwindow column that has the number of samples corresponding to a BPM value as a period by the Spx data. The Fourier transform of the above-described Expression 3 is performed on an output of the multiplier 64 and a wavelet-transformed value $w_n$ is output. The Hannwindow is an example of a window function, and a triangle window, a hamming window, or the like other than the Hannwindow can be applied.

The wavelet-transformed value $w_n$ can be obtained with regard to each BPM at a timing shifted by a ⅕ period of each BPM. That is, a periodic Hannwindow column shifted by the ⅕ period of the BPM is prepared and a wavelet-transformed value $\{w_n\}$ $0 \leq n < 5$ corresponding each periodic Hannwindow column is obtained.

Figure 20A:
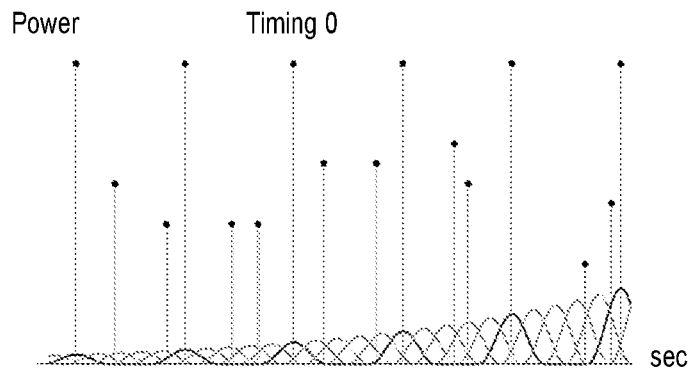
FIGS. 20A, 20B, and 20C are diagrams illustrating relations between the Spx data and periodic Hannwindow columns.
Figure 20B:
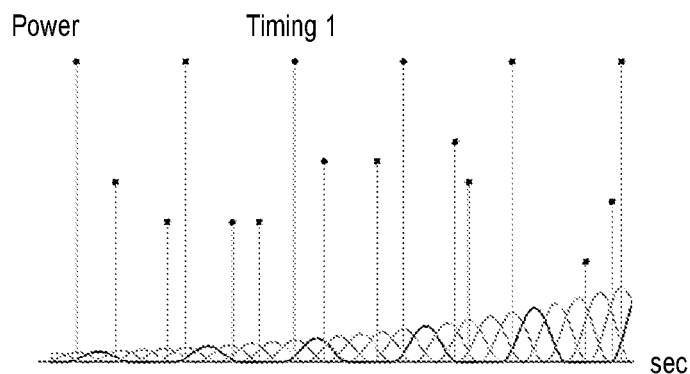
Figure 20C:
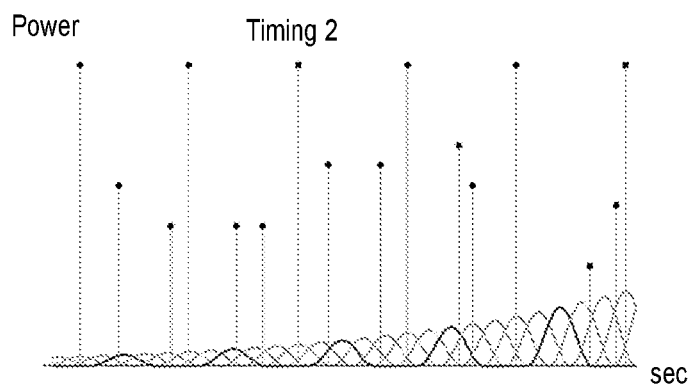

FIGS. 20A, 20B, and 20C are diagrams illustrating relations between the Spx data and periodic Hannwindow columns. In FIG. 20A, an attenuation sine wave indicating a periodic Hannwindow column of timing 0 related to a certain BPM is indicated by a bold line and an attenuation sine wave indicating a periodic Hannwindow column other than timing 0 is indicated by a fine line. In FIG. 20B, an attenuation sine wave indicating a periodic Hannwindow column of timing 1 (advanced by a ⅕ period from timing 0) related to a certain BPM is indicated by a bold line and an attenuation sine wave indicating a periodic Hannwindow column other than timing 1 is indicated by a fine line. In FIG. 20C, an attenuation sine wave indicating a periodic Hannwindow column of timing 2 (advanced by a ⅕ period from timing 1) related to a certain BPM is indicated by a bold line and an attenuation sine wave indicating a periodic Hannwindow column other than timing 1 is indicated by a fine line.

In S53, like S13, the calculation unit 103 determines a BPM corresponding to a Fourier-transformed value of which an absolute value is maximum among Fourier-transformed values corresponding to a plurality of BPMs as a BPM of the Spx data (beat). The calculation unit 103 determines the number of samples for one period of the beat of the determined BPM as period data of the beat (S54).

Figure 21:
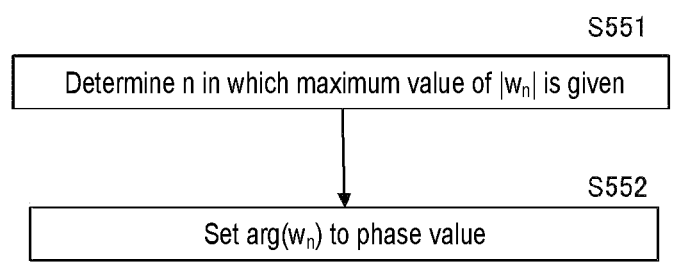
FIG. 21 is a flowchart illustrating an example of a process of calculating phase data.

In S55, the calculation unit 103 calculates a phase value from the predetermined number of wavelet-transformed values corresponding to the BPM and converts the phase value to a sample value for the period data. That is, the calculation unit 103 obtains n when the absolute value of the wavelet-transformed value $w_n$ is maximum (S551 of FIG. 21) and obtains a phase value $\text{Arg}(w_n)$ corresponding to n (S552 of FIG. 21). The calculation unit 103 converts the phase value into a sample value (phase data) for the period data (S55) and outputs the period data and the phase data (S56).

Figure 22:
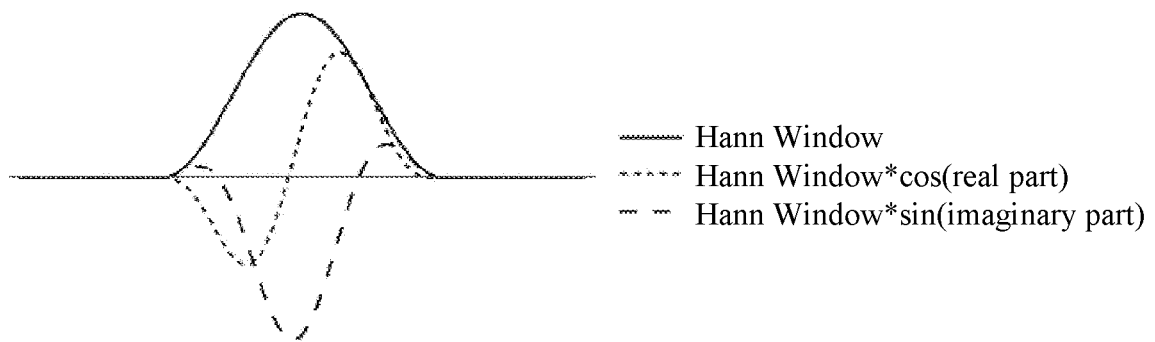
FIG. 22 is a diagram illustrating a wavelet-transformed value.

FIG. 22 is a diagram illustrating a wavelet-transformed value. The wavelet-transformed values are localized unevenly on time and have phase information of a complex number. That is, the wavelet-transformed value has a curve of a Hannwindow, a curve related to a product of the Hannwindow and a real part (cosine), and a curve related to a product of the Hannwindow and an imaginary part (sine). In the embodiment, the phase of the beat can be detected with high accuracy using a plurality of wavelet-transformed values in which a timing is shifted by a ⅕ period (where n=5) with respect to one piece of Spx data (beat). Since the process of detecting the beat timing is the same as that of the first method (see FIG. 14), description thereof will be omitted.

According to the second method, it is possible to further reduce a storage capacity and a calculation amount necessary for a process than in the first method and improve detection accuracy of the phase (the beat timing).

Calculation of Beat Intensity

Hereinafter, a method of calculating a beat intensity which can be applied to the first and second embodiments will be described. The beat intensity can be calculated by, for example, the controller 50 in the first embodiment or the beat timing detection unit 100 (for example, the calculation unit 103) in the second embodiment.

For example, m is an average of past 5 beat intervals (the number of samples). For m, a variation ratio Qrate of a period can be calculated from a new beat interval I using the following Expression 8. As the value of a variation ratio Qrate is smaller, the beat is further stabilized.

[Math. 6]

$$Qrate = \frac{|I - m|}{m} \quad (8)$$

As indicated in the following Expression 9, when the variation ratio Qrate is equal to or less than 2%, the beat intensity can be regarded as "strong" and the beat intensity can be regarded as "weak" in a variation equal to or greater than 5%. As a value of ibt indicated in the following Expression 9 is larger, a stabilized beat is indicated. For example, it is considered that ibt is smoothed using the following Expression 10 and a variation in an abrupt beat period is suppressed.

[Math. 7]

$$ibt = \begin{cases} 1.0 & Qrate < 0.02 \\ \dfrac{0.05 - Qrate}{0.03} & 0.02 \leq Qrate \leq 0.05 \\ 0.0 & Qrate > 0.05 \end{cases} \quad (9)$$

$$[\text{present } IBS] = [\text{immediately previous } IBS] + \\ 0.1 * (ibt - [\text{immediately previous } IBS]) \quad (10)$$

Figure 23:
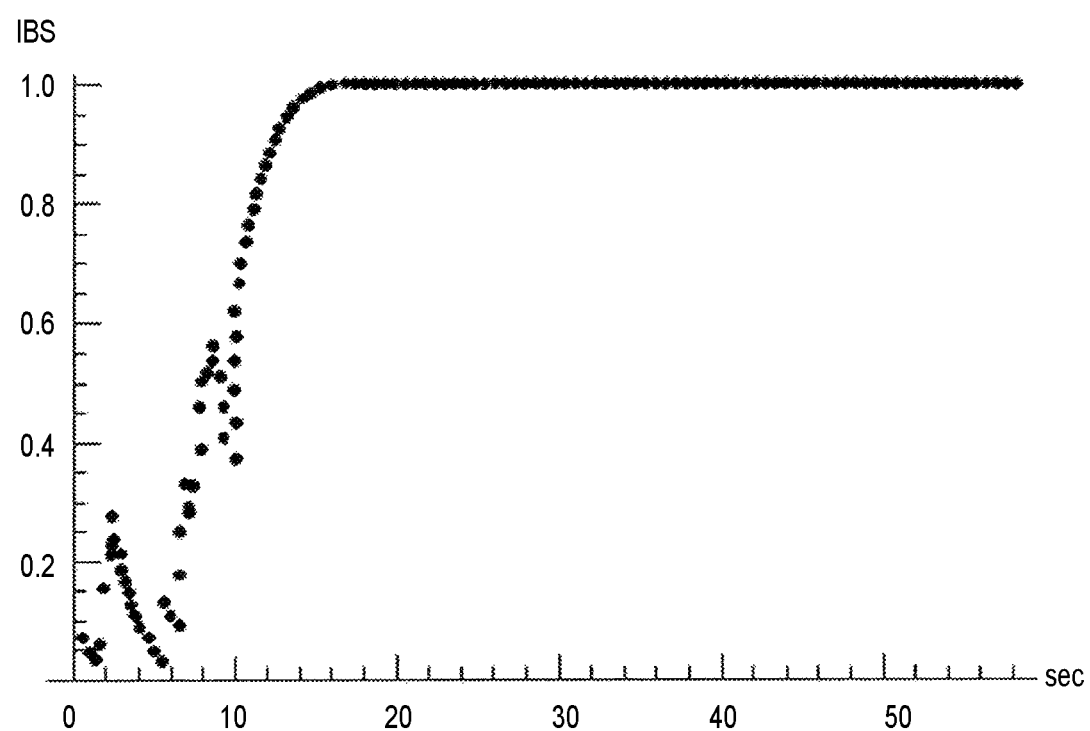
FIG. 23 is a graph illustrating a beat intensity (IBS) of a certain musical piece.

FIG. 23 is a graph illustrating IBS of a certain musical piece. A tempo is unclear from start of performance to about 12 seconds. In this case, IBS starts from a small value and increases to the vicinity of 1.0 when the tempo becomes clear. IBS represents how much a detected beat timing or beat interval is credible musically. For example, in the first embodiment, a section in which IBS is less than a predetermined value (for example, 0.6) can be determined to a non-detection section of a beat. The above-described configurations are exemplary and can be appropriately combined.

What is claimed is:
1. A video control device comprising:
   a detection unit configured to detect a beat timing of an audio; and
   a control unit configured to control a video including a first video and a second video different from the first video displayed on a display device based on the beat timing,
   wherein the control unit switches the video displayed on the display device from one of the first video and the second video to another video of the first video and the second video as controlling of the video,
   wherein the control unit performs a parallel playback process of the audio, the first video, and the second video and performs repeated playback of the first video or the second video ended during playback of the audio,
   wherein the audio is attached with the video which is being reproduced, and
   wherein the beat timing of the audio is detected by the detection unit from the audio attached with the video which is being reproduced, wherein the detection unit performs a process of generating timing information for governing a beat of the audio and intensity data indicating power at a timing from data of the audio, a process of calculating a period and a phase of the beat of the audio using the intensity data, and a process of detecting the beat timing based on the period and the phase of the beat of the audio, wherein the detection unit performs Fourier transform that has an attenuation term on the intensity data with regard to a plurality of beats per minute (BPMs) and calculates, as the period of the beat of the audio, a BPM among the plurality of BPMs when an absolute value of a value of the Fourier transform is maximum.

2. The video control device according to claim 1,
wherein the first video comprises the audio, and
wherein in the playback process, the first video and the second video are parallel and the control unit performs repeated playback of one of the first video or the second video ended during playback of the other one of the first video and the second video.

3. The video control device according to claim 1, wherein the control unit performs at least one of addition of an effect, a change in the effect, and cancellation of the addition on the video displayed on the display device as the controlling of the video.

4. The video control device according to claim 3, wherein the control unit changes a parameter of the video related to the effect as the change in the video.

5. The video control device according to claim 3, wherein the control unit changes intensity of the parameter in accordance with a waveform of a temporally changing predetermined signal.

6. The video control device according to claim 5, wherein the predetermined signal is a signal of the audio or a signal in which a signal different from a signal of the audio is mixed with the signal of the audio.

7. The video control device according to claim 1, wherein the control unit switches the video by using a plurality of continuous detections of the beat timing as a chance.

8. A video control device comprising:
a detection unit configured to detect a beat timing of an audio; and
a control unit configured to control a video including a first video and a second video different from the first video displayed on a display device based on the beat timing,
wherein the control unit switches the video displayed on the display device from one of the first video and the second video to another video of the first video and the second video as controlling of the video,
wherein the control unit performs a parallel playback process of the audio, the first video, and the second video and performs repeated playback of the first video or the second video ended during playback of the audio,
wherein the audio is attached with the video which is being reproduced, and
wherein the beat timing of the audio is detected by the detection unit from the audio attached with the video which is being reproduced,
wherein the detection unit performs a process of generating timing information for governing a beat of the audio and intensity data indicating power at a timing from data of the audio, a process of calculating a period and a phase of the beat of the audio using the intensity data, and a process of detecting the beat timing based on the period and the phase of the beat of the audio, wherein the detection unit obtains a plurality of wavelet-transformed values by performing Fourier transform on a plurality of values obtained by multiplying window functions shifted by a 1/n period of a BPM corresponding to the period of the beat of the audio by the intensity data, and calculates, as the phase of the beat of the audio, a phase when absolute values of the plurality of wavelet-transformed values are maximum, and n is an integer equal to or greater than 2.

9. The video control device according to claim 8,
wherein the first video comprises the audio, and
wherein in the playback process, the first video and the second video are parallel and the control unit performs repeated playback of one of the first video or the second video ended during playback of the other one of the first video and the second video.

10. The video control device according to claim 8, wherein the control unit performs at least one of addition of an effect, a change in the effect, and cancellation of the addition on the video displayed on the display device as the controlling of the video.

11. The video control device according to claim 10, wherein the control unit changes a parameter of the video related to the effect as the change in the video.

12. The video control device according to claim 10, wherein the control unit changes intensity of the parameter in accordance with a waveform of a temporally changing predetermined signal.

13. The video control device according to claim 12, wherein the predetermined signal is a signal of the audio or a signal in which a signal different from a signal of the audio is mixed with the signal of the audio.

14. The video control device according to claim 8, wherein the control unit switches the video by using a plurality of continuous detections of the beat timing as a chance.

15. A video control device comprising:
a detection unit configured to detect a beat timing of an audio; and
a control unit configured to control a video including a first video and a second video different from the first video displayed on a display device based on the beat timing,
wherein the control unit switches the video displayed on the display device from one of the first video and the second video to another video of the first video and the second video as controlling of the video,
wherein the control unit performs a parallel playback process of the audio, the first video, and the second video and performs repeated playback of the first video or the second video ended during playback of the audio,
wherein the audio is attached with the video which is being reproduced, and
wherein the beat timing of the audio is detected by the detection unit from the audio attached with the video which is being reproduced,
wherein the detection unit performs a process of generating timing information for governing a beat of the audio and intensity data indicating power at a timing from data of the audio, a process of calculating a period and a phase of the beat of the audio using the intensity data, and a process of detecting the beat timing based on the period and the phase of the beat of the audio,
wherein the detection unit obtains a count value indicating the period of the beat and the phase of the beat, measures the count value using a counter incremented for each sample of a sampling rate, and detects a timing at which a value of the counter reaches the count value as the beat timing.

16. The video control device according to claim 15, wherein the first video comprises the audio, and wherein in the playback process, the first video and the second video are parallel and the control unit performs repeated playback of one of the first video or the second video ended during playback of the other one of the first video and the second video.

17. The video control device according to claim 15, wherein the control unit performs at least one of addition of an effect, a change in the effect, and cancellation of the addition on the video displayed on the display device as the controlling of the video.

18. The video control device according to claim 17, wherein the control unit changes a parameter of the video related to the effect as the change in the video.

19. The video control device according to claim 17, wherein the control unit changes intensity of the parameter in accordance with a waveform of a temporally changing predetermined signal.

20. The video control device according to claim 19, wherein the predetermined signal is a signal of the audio or a signal in which a signal different from a signal of the audio is mixed with the signal of the audio.

* * * * *